United States Patent
Park et al.

(10) Patent No.: US 10,095,411 B2
(45) Date of Patent: Oct. 9, 2018

(54) CONTROLLERS INCLUDING SEPARATE INPUT-OUTPUT CIRCUITS FOR MAPPING TABLE AND BUFFER MEMORY, SOLID STATE DRIVES INCLUDING THE CONTROLLERS, AND COMPUTING SYSTEMS INCLUDING THE SOLID STATE DRIVES

(71) Applicants: Ji-Woon Park, Suwon-si (KR); Byung-Ho Kim, Suwon-si (KR)

(72) Inventors: Ji-Woon Park, Suwon-si (KR); Byung-Ho Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 81 days.

(21) Appl. No.: 14/857,871

(22) Filed: Sep. 18, 2015

(65) Prior Publication Data
US 2016/0085447 A1  Mar. 24, 2016

(30) Foreign Application Priority Data
Sep. 24, 2014  (KR) .................. 10-2014-0127373

(51) Int. Cl.
 G06F 3/06  (2006.01)
 G06F 12/02  (2006.01)

(52) U.S. Cl.
 CPC ............ G06F 3/061 (2013.01); G06F 3/0646 (2013.01); G06F 3/0673 (2013.01);
 (Continued)

(58) Field of Classification Search
 CPC ...... G06F 3/061; G06F 3/0646; G06F 3/0673; G06F 12/0246; G06F 2212/214;
 (Continued)

(56) References Cited

U.S. PATENT DOCUMENTS 5,630,093 A * 5/1997 Holzhammer ........ G06F 3/0601
   711/115
5,905,993 A * 5/1999 Shinohara ............. G06F 3/0601
   711/102
(Continued)

FOREIGN PATENT DOCUMENTS

KR  10-0578143 B1  5/2006
KR  10-2009-0098275 A  9/2009
(Continued)

OTHER PUBLICATIONS

Felch, A., "Flash vs DRAM", Nov. 5, 2010, hosted by the Daily Circuit, <http://www.dailycircuitry.com/2010/11/flashvsdram.html>. *

(Continued)

*Primary Examiner* — Reginald G Bragdon
*Assistant Examiner* — Aaron D Ho
(74) *Attorney, Agent, or Firm* — Myers Bigel, P.A.

(57) ABSTRACT

Solid state drives may include a controller, a mapping table and a buffer memory. The controller provides a logical address of associated data through a first input-output unit at a first speed and provides the associated data through a second input-output unit at a second speed. The controller may be connected to the first input-output unit and the second input-output unit. The mapping table may be connected to the controller through the first input-output unit. The buffer memory may be connected to the controller through the second input-output unit. The first input-output unit may be physically separated from the second input-output unit. The first speed may be different from the second speed.

16 Claims, 14 Drawing Sheets

(52) U.S. Cl.
CPC .... *G06F 12/0246* (2013.01); *G06F 2212/214* (2013.01); *G06F 2212/7201* (2013.01); *G06F 2212/7203* (2013.01)

(58) Field of Classification Search
CPC ..... G06F 2212/7201; G06F 2212/7203; G06F 13/1694
USPC .................................................. 711/105, 154
See application file for complete search history.

(56) References Cited

U.S. PATENT DOCUMENTS

| | | | | |
|---|---|---|---|---|
| 5,946,714 | A * | 8/1999 | Miyauchi | G06F 12/0246 711/103 |
| 6,134,638 | A * | 10/2000 | Olarig | G06F 13/1694 710/112 |
| 6,151,271 | A * | 11/2000 | Lee | G11C 7/1006 365/194 |
| 6,199,150 | B1 * | 3/2001 | Yoshikawa | G06F 12/08 711/170 |
| 8,341,332 | B2 | 12/2012 | Ma et al. | |
| 9,213,604 | B2 * | 12/2015 | Kimura | G06F 11/108 |
| 2004/0065744 | A1 * | 4/2004 | Shiraishi | G11C 16/3418 235/492 |
| 2008/0222350 | A1 | 9/2008 | Chang | |
| 2009/0292839 | A1 | 11/2009 | Oh | |
| 2010/0287333 | A1 | 11/2010 | Lee et al. | |
| 2012/0124276 | A1 | 5/2012 | Ahn et al. | |
| 2012/0246392 | A1 | 9/2012 | Cheon | |
| 2013/0080687 | A1 | 3/2013 | Nemazie et al. | |
| 2013/0086311 | A1 | 4/2013 | Huang et al. | |
| 2013/0166825 | A1 | 6/2013 | Kim et al. | |
| 2013/0311711 | A1 | 11/2013 | Yang et al. | |
| 2014/0006851 | A1 * | 1/2014 | Kimura | G06F 11/108 714/6.24 |
| 2014/0059279 | A1 | 2/2014 | He et al. | |
| 2014/0068160 | A1 | 3/2014 | So et al. | |

FOREIGN PATENT DOCUMENTS

| | | |
|---|---|---|
| KR | 10-2010-0128120 A | 12/2010 |
| KR | 10-2012-0108339 A | 10/2012 |
| KR | 10-2013-0075135 A | 7/2013 |

OTHER PUBLICATIONS

Micron Technology, Inc., "1Gb: x4, x8, x16 DDR SDRAM Features", updated 2003.*
Micron Technology, Inc., "TN-29-19: NAND Flash 101 Introduction", updated Apr. 2010.*
Mueller, S., "Upgrading and Repairing PCs: Memory", Jan. 6, 2010, hosted by Que Publishing, <http://www.quepublishing.com/articles/article.aspx?p=1416688&seqNum=2>.*
Micron Technology, Inc., "256 MB: x4, x8, x16 DDR SDRAM Features", updated 2003.*
H.G. Lee, N.Chang, U.Y. Ogras, and R. Marculescu. 2008. "On-chip communication architecture exploration: A quantitative evaluation of point-to-point, bus, and network-on-chip approaches". ACM Trans. Des. Autom. Electron. Syst. 12, 3, Article 23 (May 2008), 20 pages. DOI=http://dx.doi.org/10.1145/125 (Year: 2008).*
Brent Keeth, R. Jacob Baker, Brian Johnson, and Feng Lin. 2007. DRAM Circuit Design: Fundamental and High-Speed Topics (2nd ed.). Wiley-IEEE Press. pp. 9-11. Preview provided by Google Books. <https://books.google.com/books?id=TgW3LTubREQC&dq> (Year: 2007).*

* cited by examiner

FIG. 3

|  | SSD NAND | DRAM |
|---|---|---|
| CAPACITY | 2TB→4TB | 2GB→4GB |

FIG. 4

|  | INCREASE OF DRAM CAPACITY | DECREASE OF DRAM CAPACITY |
|---|---|---|
| PARASTIC CAPACITANCE | HIGH | LOW |
| OPERATION SPEED | LOW | HIGH |

|  | MAPPING TABLE | BUFFER MEMORY |
|---|---|---|
| TOTAL SIZE OF DRAM (9G BYTE) | 8.1GB | 0.9GB |

| | SPEED | | CTRL TO DRAM TIME | | TOTAL TIME |
|---|---|---|---|---|---|
| | MAPPING TABLE | BUFFER | MAPPING TABLE (32bit) | BUFFER (4KB) | |
| IDEAL | 1600Mbps | | 0.625ns | 640ns | 640.625ns |
| CONVENTIONAL METHOD | 1066Mbps(LPDDR3 4GB) | | 0.938ns | 960.512ns | 961.45ns |
| PROPOSED METHOD | 800Mbps | 1600Mbps | 1.25ns | 640ns | 641.25ns |

| | OPERATIONAL SPEED (HIGH) | OPERATIONAL SPEED (LOW) |
|---|---|---|
| NUMBER OF I/O LINES IN A FIRST I/O UNIT | HIGH | LOW |

CONTROLLERS INCLUDING SEPARATE INPUT-OUTPUT CIRCUITS FOR MAPPING TABLE AND BUFFER MEMORY, SOLID STATE DRIVES INCLUDING THE CONTROLLERS, AND COMPUTING SYSTEMS INCLUDING THE SOLID STATE DRIVES

CROSS-REFERENCE TO RELATED APPLICATION

This application claims priority under 35 USC § 119 to Korean Patent Applications No. 10-2014-0127373, filed on Sep. 24, 2014, in the Korean Intellectual Property Office (KIPO), the disclosure of which is herein incorporated by reference in their entirety.

BACKGROUND

Technical Field

Example embodiments generally relate to a storage device and more particularly to a solid state drive and a computing system including the solid state drive.

Description of the Related Art

Hard disk drives (HDD) have been used as a data storage of electronic devices. Recently, solid state drives (SSD) including flash memories are being used instead of a HDD as a data storage of electronic devices. In addition, various researches are in progress to increase operation speed of the solid state drives.

SUMMARY

Some example embodiments provide a solid state drive capable of increasing an operational speed by separating a first input-output unit that connects a controller and a mapping table from a second input-output unit that connects the controller and a buffer memory.

Some example embodiments provide a computing system capable of increasing an operational speed by separating a first input-output unit that connects a controller and a mapping table from a second input-output unit that connects a controller and a buffer memory.

A solid state drive may include a controller configured to provide a logical address of associated data through a first input-output circuit at a first speed and configured to provide the associated data through a second input-output circuit at a second speed. The controller may be connected to the first input-output circuit and the second input-output circuit, the first input-output circuit may be physically separated from the second input-output circuit, and the second speed may be different from the first speed. The solid state drive may also include a mapping table connected to the controller through the first input-output circuit and configured to map the logical address of the associated data that is provided through the first input-output circuit to a physical address of the associated data. The solid state drive may further include a buffer memory connected to the controller through the second input-output circuit and configured to buffer the associated data that is provided through the second input-output circuit.

According to various embodiments, the controller may be configured to receive an input signal including the logical address of the associated data and the associated data, and the controller may include a selection circuit that is configured to separate the associated data from the logical address of the associated data.

In various embodiments, the selection circuit may be configured to provide the logical address of the associated data to the mapping table through the first input-output circuit.

In various embodiments, the selection circuit may be configured to provide the associated data to the buffer memory through the second input-output circuit.

According to various embodiments, a storage capacity of the mapping table may be greater than a storage capacity of the buffer memory.

According to various embodiments, the second speed may be greater than the first speed.

In various embodiments, the first input-output circuit may include a first number of first input-output lines, and the second input-output circuit may include a second number of second input-output lines.

According to various embodiments, the first number may be different from the second number.

According to various embodiments, the first number may be less than the second number.

In various embodiments, the first number may be determined based on an operational speed of the solid state drive.

According to various embodiments, the first number may be equal to the second number.

According to various embodiments, the first number may be one.

A solid state drive may include a controller configured to provide a logical address of associated data through a first input-output circuit at a first speed and configured to provide the associated data through a second input-output circuit at a second speed. The controller may be connected to the first input-output circuit and the second input-output circuit, the first input-output circuit may be physically separated from the second input-output circuit, and the second speed may be different from the first speed. The solid state drive may also include a mapping table connected to the controller through the first input-output circuit and configured to map the logical address of the associated data that is provided through the first input-output circuit to a physical address of the associated data. The solid state drive may further include a buffer memory connected to the controller through the second input-output circuit and configured to buffer the associated data that is provided through the second input-output circuit and a storage memory configured to store the associated data.

According to various embodiments, the physical address of the associated data may be one of a physical address of the storage memory.

In various embodiments, the controller may be configured to receive the physical address of the associated data from the mapping table through the first input-output circuit and configured to provide the physical address of the associated data to the storage memory.

According to various embodiments, the controller may be configured to receive the associated data from the buffer memory through the second input-output circuit and configured to provide the associated data to the storage memory.

According to various embodiments, the associated data may be stored in the physical address of the storage memory.

According to various embodiments, the storage memory may include a memory cell array including a three-dimensional memory array.

In various embodiments, a number of first input-output lines included in the first input-output circuit may be less than or equal to a number of second input-output lines included in the second input-output circuit.

According to various embodiments, a number of first input-output lines included in the first input-output circuit may be determined based on an operational speed of the solid state drive.

A computing system may include a processor configured to provide an input signal that includes associated data and a logical address of the associated data and a solid state drive configured to receive the input signal and configured to store the associated data in a physical address of the associated data. The solid state drive may include a controller configured to provide the logical address of the associated data through a first input-output circuit at a first speed and configured to provide the associated data through a second input-output circuit at a second speed. The controller may be connected to the first input-output circuit and the second input-output circuit, the first input-output circuit may be physically separated from the second input-output circuit, and the second speed may be different from the first speed. The solid state drive may also include a mapping table connected to the controller through the first input-output circuit and configured to map the logical address of the associated data that is provided through the first input-output circuit to the physical address of the associated data. The solid state drive may further include a buffer memory connected to the controller through the second input-output circuit and configured to buffer the associated data that may be provided through the second input-output circuit.

According to various embodiments, the controller may be configured to receive the input signal including the logical address of the associated data and the associated data, and the controller may include a selection circuit that is configured to separate the associated data from the logical address of the associated data.

In various embodiments, the selection circuit may be configured to provide the logical address to the mapping table through the first input-output circuit and configured to provide the associated data to the buffer memory through the second input-output circuit.

In various embodiments, the solid state drive further may include a power management circuit that is configured to supply a power supply voltage to each of the controller, the buffer memory and the mapping table.

A solid state drive may include a controller configured to transmit a logical address of associated data and the associated data through an input-output circuit at different speeds and a memory device including a mapping table and a buffer memory. The mapping table may be configured to receive the logical address of the associated data from the controller through the input-output circuit and configured to map the logical address of the associated data to physical addresses of the associated data, and the buffer memory may be configured to receive the associated data from the controller through the input-output circuit and configured to buffer the associated data.

According to various embodiments, the input-output circuit may include a first input-output circuit and a second input-output circuit that may be physically separated from the first input-output circuit, the mapping table may be configured to receive the logical address of the associated data from the controller through the first input-output circuit, and the buffer memory may be configured to receive the associated data from the controller through the second input-output circuit.

In various embodiments, the first input-output circuit may include a first number of input-output lines, and the second input-output circuit may include a second number of input-output lines. The second number may be greater than the first number.

According to various embodiments, the controller may be configured to transmit the logical address of the associated data at a first speed, and the controller may be configured to transmit the associated data at a second speed that may be greater than the first speed.

In various embodiments, a storage capacity of the mapping table may be greater than a storage capacity of the buffer memory.

According to various embodiments, the memory device may include a first Dynamic Random Access Memory (DRAM) including the mapping table and a second DRAM including the buffer memory. The first DRAM may be physically separated from the second DRAM.

In various embodiments, the input-output circuit may include first input-output lines and second input-output lines that are physically separated from the first input-out lines, and the first input-output lines may be directly connected to the controller and the first DRAM, and the second input-output lines may be directly connected to the controller and the second DRAM.

According to various embodiments, the controller may be configured to transmit the logical address of the associated data at a first speed, and the controller may be configured to transmit the associated data at a second speed, and the first speed may be a first throughput and the second speed may be a second throughput.

A controller of a solid state drive may include a first input-output interface configured to connect to a first input-output circuit and a second input-output interface configured to connect to a second input-output circuit. The first input-output interface may be configured to provide a logical address of associated data at a first speed, and the second input-output interface may be configured to provide the associated data at a second speed that may be greater than the first speed.

According to various embodiments, the first input-output interface may be physically separated from the second input-output interface.

In various embodiments, the first input-output circuit may include a first number of input-output lines, and the second input-output circuit may include a second number of input-output lines. The second number may be greater than the first number.

BRIEF DESCRIPTION OF THE DRAWINGS

Illustrative, non-limiting example embodiments will be more clearly understood from the following detailed description taken in conjunction with the accompanying drawings.

FIG. 3 is a table illustrating capacities of a buffer memory and a mapping table according to capacities of a solid state drive.

FIG. 4 is a table illustrating a parasitic capacitance and an operation speed according to capacities of a buffer memory and a mapping table.

DETAILED DESCRIPTION OF THE EMBODIMENTS

Figure 1:
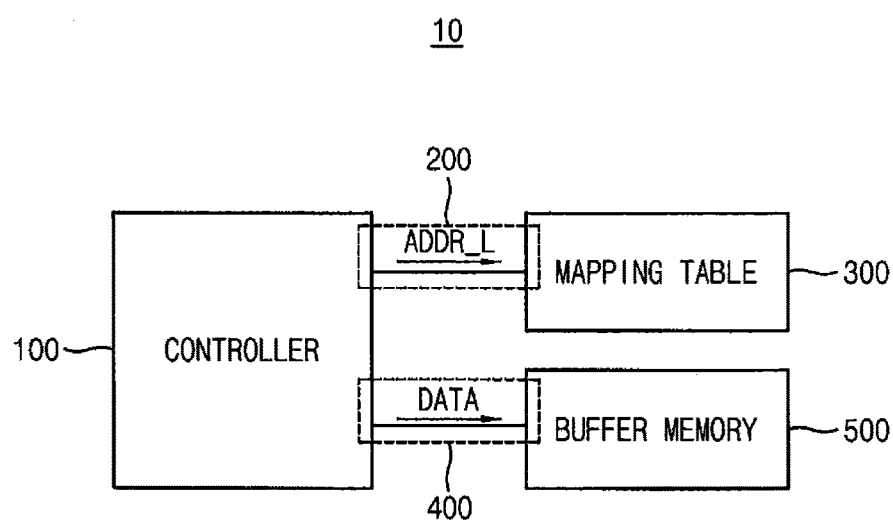
FIG. 1 is a block diagram illustrating a solid state drive according to example embodiments.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a solid state drive according to example embodiments.

Referring to FIG. 1, a solid state drive 10 includes a controller 100, a mapping table 300 and a buffer memory 500. The controller 100 provides a logical address ADDR_L of data DATA through a first input-output unit 200 and provides the data DATA through a second input-output unit 400. The controller 100 is connected to the first input-output unit 200 and the second input-output unit 400. The controller 100 may include a first input-output interface connecting to the first input-output unit 200 and a second input-output interface connecting to the second input-output unit 400. The first input-output interface may be physically separated from the second input-output interface. The first input-output unit 200 is different from the second input-output unit 400. In some embodiments, the first input-output unit 200 may be physically separated from the second input-output unit 400. It will be understood that each of the first input-output unit 200 and the second input-output unit 400 include input units and/or output units.

The mapping table 300 maps the logical address ADDR_L of the data DATA to a physical address ADDR_P of the data DATA. The logical address ADDR_L is transferred through the first input-output unit 200. The mapping table 300 is connected to the controller 100 through the first input-output unit 200. The mapping table 300 may be implemented using a volatile memory. For example, the mapping table 300 may be implemented using a DRAM. The buffer memory 500 buffers the data DATA that is transferred through the second input-output unit 400. The buffer memory 500 is connected to the controller 100 through the second input-output unit 400. As will be described with FIG. 14, the buffer memory 500 may be used to store the data DATA, that is transferred from outside at high speed, to the storage memory 600 that is operated at low speed. The buffer memory 500 may be implemented using a volatile memory. For example, the buffer memory 500 may be implemented using a DRAM. It will be understood that "speed" can refer to throughput that is measured in, for example, bits per second (bps).

For example, the first input-output unit 200 and the second input-output unit 400 may be separated (e.g., physically separated) in the solid state drive 10. The mapping table 300 that is connected to the first input-output unit 200 may be operated at low speed. The buffer memory 500 that is connected to the second input-output unit 400 may be operated at high speed. The logical address ADDR_L of the data DATA may be transferred from the controller 100 to the mapping table 300 through the first input-output unit 200. The data DATA may be transferred from the controller 100 to the buffer memory 500 through the second input-output unit 400. For example, the size of the data DATA that is transferred from the controller 100 to the buffer memory 500 through the second input-output unit 400 may be 4 KB. The size of the logical address ADDR_L of the data DATA may be 32 bits. In this case, while the data DATA of 4 KB is transferred from the controller 100 to the buffer memory 500 through the second input-output unit 400, the logical address ADDR_L of 32 bits may be transferred from the controller 100 to the mapping table 300 through the first input-output unit 200. Therefore, the data DATA of 4 KB that is transferred from the controller 100 to the buffer memory 500 through the second input-output unit 400 may be transferred at higher speed than the logical address ADDR_L of 32 bits that is transferred from the controller 100 to the mapping table 300 through the first input-output unit 200.

Figure 2:
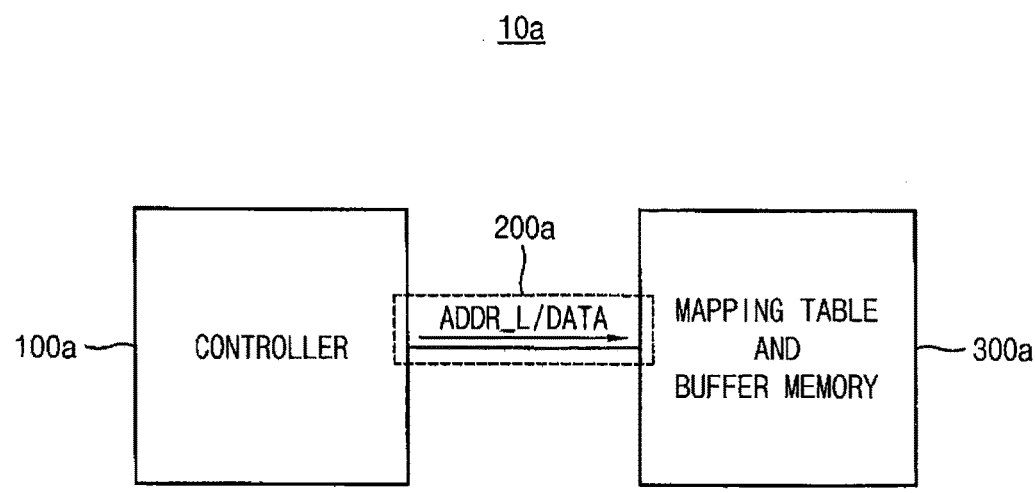
FIG. 2 is a block diagram illustrating a conventional solid state drive.

FIG. 2 is a block diagram illustrating a conventional solid state drive.

Referring to FIG. 2, a conventional solid state drive 10a may include a controller 100a and a mapping/buffer memory 300a. The mapping/buffer memory 300a may be implemented using a volatile memory. For example, the mapping/buffer memory 300a may be implemented using a DRAM.

The mapping/buffer memory 300a may include a mapping table and a buffer memory. The controller 100a may be connected to the mapping/buffer memory 300a through an input-output unit 200a. The input-output unit 200a may transfer the data DATA and the logical address ADDR_L of the data DATA from the controller 100a to the mapping/buffer memory 300a without separating the data DATA and the logical address ADDR_L. As the operation speed of the solid state drive 10 is increased, the data DATA that is transferred through the input-output unit 200a may be transferred at higher speed. For example, the size of the data DATA that is transferred from the controller 100a to the mapping/buffer memory 300a through the input-output unit 200a may be 4 KB. The logical address ADDR_L of the data DATA may be 32 bits. In this case, while the data DATA of 4 KB is transferred from the controller 100a to the mapping/buffer memory 300a through the input-output unit 200a, the logical address ADDR_L of 32 bits may be transferred from the controller 100a to the mapping/buffer memory 300a through the input-output unit 200a. Because the input-output unit 200a included in the conventional solid state drive 10a transfers the data DATA and the logical address ADDR_L of the data DATA from the controller 100a to the mapping/buffer memory 300a without separating the data DATA and the logical address ADDR_L, the transfer speed of the data DATA from the controller 100a to the mapping/buffer memory 300a may not be controlled differently from the transfer speed of the logical address ADDR_L from the controller 100a to the mapping/buffer memory 300a. In other word, the transfer speed of the data DATA from the controller 100a to the mapping/buffer memory 300a may be equal to the transfer speed of the logical address ADDR_L from the controller 100a to the mapping/buffer memory 300a.

FIG. 3 is a table illustrating capacities of a buffer memory and a mapping table according to capacities of a solid state drive and FIG. 4 is a table illustrating a parasitic capacitance and an operation speed according to capacities of a buffer memory and a mapping table 300.

Referring to FIGS. 3 and 4, a solid state drive 10 may include a non-volatile memory and a volatile memory. The non-volatile memory may be used to store the data DATA. For example, the non-volatile memory may include a NAND flash memory. The volatile memory may be used as the buffer memory 500 that buffers the data DATA. In addition, the volatile memory may be used as the mapping table 300 that maps the logical address ADDR_L of the data DATA to the physical address ADDR_P. For example, the volatile memory may include a DRAM. In some embodiments, the volatile memory may include several DRAMs, and the mapping table 300 and the buffer memory 500 may be in different DRAMs.

If the storage capacity of the solid state drive 10 is increased, the storage capacity of the non-volatile memory included in the solid state drive 10 may be increased. The data DATA may be stored in the non-volatile memory. If the storage capacity of the non-volatile memory included in the solid state drive 10 is increased, the storage capacity of the mapping/buffer memory 300a may be increased. In other words, if the storage capacity of the non-volatile memory included in the solid state drive 10 is increased, the storage capacity of the volatile memory included in the solid state drive 10 may be increased. For example, the non-volatile memory included in the solid state drive 10 may be a NAND flash memory. The volatile memory included in the solid state drive 10 may be a DRAM. In case the storage capacity of the non-volatile memory is increased from 2 TB to 4 TB, the storage capacity of the volatile memory including the mapping/buffer memory 300a may be increased from 2 GB to 4 GB.

If the storage capacity of the non-volatile memory included in the solid state drive 10 is increased, the storage capacity of the volatile memory included in the solid state drive 10 may be increased. If the storage capacity of the volatile memory is increased, the parasitic capacitance of the input-output unit 200a may be increased. If the parasitic capacitance of the input-output unit 200a is increased, the transfer speed of the data DATA between the controller 100a and the mapping/buffer memory 300a may be decreased. For example, In case the storage capacity of the non-volatile memory is increased from 2 TB to 4 TB, the storage capacity of the mapping/buffer memory 300a may be increased from 2 GB to 4 GB. If the storage capacity of the mapping/buffer memory 300a is increased from 2 GB to 4 GB, the parasitic capacitance of the input-output unit 200a may be increased. Therefore, if the parasitic capacitance of the input-output unit 200a is increased, the transfer speed of the data DATA between the controller 100a and the mapping/buffer memory 300a may be decreased.

Therefore, the solid state drive 10 according to example embodiments may increase an operation speed by separating the first input-output unit 200 that connects the controller 100 and the mapping table 300 from the second input-output unit 400 that connects the controller 100 and the buffer memory 500. In some embodiments, the first input-output unit 200 may be physically separated from the second input-output unit 400.

Figures 5, 6:
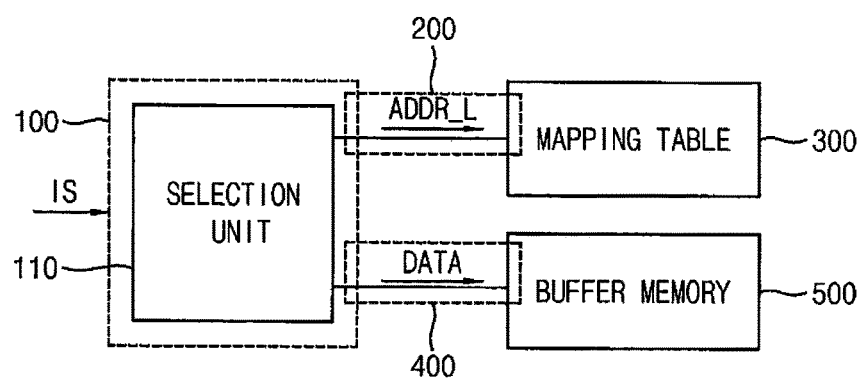
FIG. 5 is a block diagram illustrating a solid state drive according to example embodiments.
FIG. 6 is a table describing a storage capacity of a buffer memory and a mapping table included in the solid state drive of FIG. 5.

FIG. 5 is a block diagram illustrating a solid state drive according to example embodiments.

Referring to FIG. 5, a solid state drive 10 includes a controller 100, a mapping table 300 and a buffer memory

500. The controller 100 provides a logical address ADDR_L of data DATA through a first input-output unit 200 and provides the data DATA through a second input-output unit 400. The controller 100 is connected to the first input-output unit 200 and the second input-output unit 400. The first input-output unit 200 is different from the second input-output unit 400. In some embodiments, the first input-output unit 200 may be physically separated from the second input-output unit 400. The mapping table 300 maps the logical address ADDR_L of the data DATA to a physical address ADDR_P of the data DATA. The logical address ADDR_L is transferred through the first input-output unit 200. The mapping table 300 is connected to the controller 100 through the first input-output unit 200. The buffer memory 500 buffers the data DATA that is transferred through the second input-output unit 400. The buffer memory 500 is connected to the controller 100 through the second input-output unit 400.

In some embodiments, the controller 100 may include a selection unit 110 that receives an input signal IS including the data DATA and the logical address ADDR_L and separates the data DATA from the logical address ADDR_L. In the solid state drive 10 according to example embodiments, because the first input-output unit 200 that transfers the logical address ADDR_L is separated from the second input-output unit 400 that transfer the data DATA, the selection unit 110 included in the controller 100 may separately provide the data DATA and the logical address ADDR_L.

In some example embodiments, the selection unit 110 may provide the logical address ADDR_L to the mapping table 300 through the first input-output unit 200. For example, the selection unit 110 may provide the logical address ADDR_L to the first input-output unit 200 by selecting the logical address ADDR_L among the data DATA and the logical address ADDR_L included in the input signal IS. The logical address ADDR_L that is provided to the first input-output unit 200 may be transferred to the mapping table 300.

In some example embodiments, the selection unit 110 may provide the data DATA to the buffer memory 500 through the second input-output unit 400. For example, the selection unit 110 may provide the data DATA to the second input-output unit 400 by selecting the data DATA among the data DATA and the logical address ADDR_L included in the input signal IS. The data DATA that is provided to the second input-output unit 400 may be transferred to the buffer memory 500.

FIG. 6 is a table describing a storage capacity of a buffer memory and a mapping table included in the solid state drive of FIG. 5.

Referring to FIG. 6, a solid state drive 10 may include a non-volatile memory and a volatile memory. The volatile memory included in the solid state drive 10 may be used as the buffer memory 500 that buffers the data DATA. In addition, the volatile memory included in the solid state drive 10 may be used as the mapping table 300 that maps the logical address ADDR_L of the data DATA to the physical address ADDR_P. For example, the volatile memory may include a DRAM. In some embodiments, the volatile memory may include several DRAMs, and the mapping table 300 and the buffer memory 500 may be in different DRAMs.

A DRAM included in the solid state drive 10 may include the mapping table 300 and the buffer memory 500. For example, the storage capacity of the DRAM may be 9 GB. In case the storage capacity of DRAM is 9 GB, a storage capacity of the mapping table 300 may be 8.1 GB and a storage capacity of the buffer memory 500 may be 0.9 GB.

The mapping table 300 may be used to map the logical address ADDR_L of the data DATA to the physical address ADDR_P. The logical address ADDR_L may be transferred from the controller 100 to the mapping table 300 through the first input-output unit 200 at low speed. The data DATA may be transferred from the controller 100 to the buffer memory 500 through the second input-output unit 400 at high speed. In some embodiments, the logical address ADDR_L may be transferred from the controller 100 to the mapping table 300 at a speed less than a speed at which the DATA may be transferred from the controller 100 to the buffer memory 500.

In this case, if the data DATA and the logical address ADDR_L is transferred from the controller 100 to the mapping/buffer memory 300a using one input-output unit 200a as the conventional solid state drive 10a, the parasitic capacitance of the input-output unit 200a may be increased because the storage capacity of the mapping/buffer memory 300a is 9 GB. If the parasitic capacitance of the input-output unit 200a is increased, the transfer speed of the data DATA between the controller 100a and the mapping/buffer memory 300a may be decreased.

However, the solid state drive 10 according to example embodiments may increase an operation speed by separating the first input-output unit 200 that connects the controller 100 and the mapping table 300 from the second input-output unit 400 that connects the controller 100 and the buffer memory 500. For example, the storage capacity of DRAM may be 9 GB. In case the storage capacity of DRAM is 9 GB, the mapping table 300 may be 8.1 GB and the buffer memory 500 may be 0.9 GB. In case the mapping table 300 is 8.1 GB and the buffer memory 500 is 0.9 GB, the parasitic capacitance of the second input-output unit 400 connected to the buffer memory 500 may be less than the parasitic capacitance of the first input-output unit 200 connected to the mapping table 300. If the parasitic capacitance of the second input-output unit 400 connected to the buffer memory 500 is less than the parasitic capacitance of the first input-output unit 200 connected to the mapping table 300, the transfer speed of the data DATA through the second input-output unit 400 may be greater than the transfer speed of the logical address ADDR_L through the first input-output unit 200.

For example, the size of the data DATA that is transferred from the controller 100 to the buffer memory 500 through the second input-output unit 400 may be 4 KB. The size of the logical address ADDR_L of the data DATA may be 32 bits. In this case, while the data DATA of 4 KB is transferred from the controller 100 to the buffer memory 500 through the second input-output unit 400, the logical address ADDR_L of 32 bits may be transferred from the controller 100 to the mapping table 300 through the first input-output unit 200. Therefore, the data DATA of 4 KB that is transferred from the controller 100 to the buffer memory 500 through the second input-output unit 400 may be transferred at higher speed than the logical address ADDR_L of 32 bits that is transferred from the controller 100 to the mapping table 300 through the first input-output unit 200.

Therefore, the solid state drive 10 according to example embodiments may increase an operation speed by separating the first input-output unit 200 that connects the controller 100 and the mapping table 300 from the second input-output unit 400 that connects the controller 100 and the buffer memory 500.

In some example embodiments, a size (e.g., storage capacity) of the mapping table 300 may be greater than a size of the buffer memory 500. For example, the storage capacity of DRAM may be 9 GB. In case the storage capacity of DRAM is 9 GB, the mapping table 300 may be 8.1 GB and the buffer memory 500 may be 0.9 GB. In this case, the parasitic capacitance of the first input-output unit 200 connected to the mapping table 300 may be greater than the parasitic capacitance of the second input-output unit 400 connected to the buffer memory 500. The logical address ADDR_L may be transferred through the first input-output unit 200. The data DATA may be transferred through the second input-output unit 400. The mapping table 300 that is connected to the first input-output unit 200 may be operated at low speed. The buffer memory 500 that is connected to the second input-output unit 400 may be operated at high speed. Therefore, if the solid state drive 10 according to example embodiments is used, the operation speed of the solid state drive 10 may be increased.

In some example embodiments, a transfer speed of the data DATA that is transferred through the second input-output unit 400 may be different from a transfer speed of the logical address ADDR_L that is transferred through the first input-output unit 200. For example, the transfer speed of the data DATA that is transferred through the second input-output unit 400 may be greater than the transfer speed of the logical address ADDR_L that is transferred through the first input-output unit 200.

Figures 7, 8:
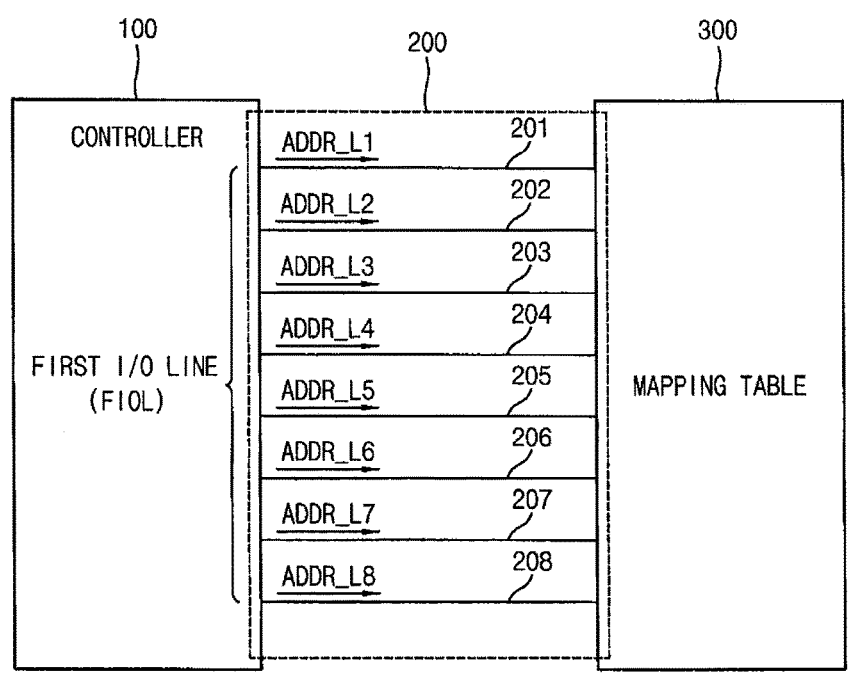
FIG. 7 is a table describing an operation speed of a solid state drive according to example embodiments and an operation speed of a conventional solid state drive.
FIG. 8 is a diagram illustrating an example of a first input-output unit included in the solid state drive of FIG. 1.

FIG. 7 is a table describing an operation speed of a solid state drive according to example embodiments and an operation speed of a conventional solid state drive.

Referring to FIG. 7, the conventional solid state drive 10a may transfer the data DATA and the logical address ADDR_L from the controller 100a to the mapping/buffer memory 300a through one input-output unit 200a. In this case, because the parasitic capacitance of the input-output unit 200a is increased, the transfer speed of the data DATA from the controller 100a to the mapping/buffer memory 300a may be decreased. For example, if the conventional solid state drive 10a is used, 0.938 ns may be required to transfer the logical address ADDR_L of 32 bits from the controller 100a to the mapping/buffer memory 300a. In addition, 960.512 ns may be required to transfer the data DATA of 4 KB from the controller 100a to the mapping/buffer memory 300a. Therefore, 961.45 ns is required to transfer the logical address ADDR_L of 32 bits and the data DATA of 4 KB from the controller 100a to the mapping/buffer memory 300a.

In the solid state drive 10 according to example embodiments, the logical address ADDR_L may be transferred through the first input-output unit 200. The data DATA may be transferred through the second input-output unit 400 that is different from the first input-output unit 200. In this case, because the parasitic capacitance of the second input-output unit 400 transferring the data DATA is very small, the operation speed of the solid state drive 10 may be increased. For example, if the solid state drive 10 according to example embodiments is used, 1.25 ns may be required to transfer the logical address ADDR_L of 32 bits from the controller 100 to the mapping table 300 through the first input-output unit 200. In addition, 640 ns may be required to transfer the data DATA of 4 KB from the controller 100 to the buffer memory 500 through the second input-output unit 400. Therefore, 641.25 ns is required to transfer the logical address ADDR_L of 32 bits and the data DATA of 4 KB from the controller 100 to the mapping table 300 and buffer memory 500.

The solid state drive 10 according to example embodiments may increase an operation speed by separating the first input-output unit 200 that connects the controller 100 and the mapping table 300 from the second input-output unit 400 that connects the controller 100 and the buffer memory 500.

Figure 9:
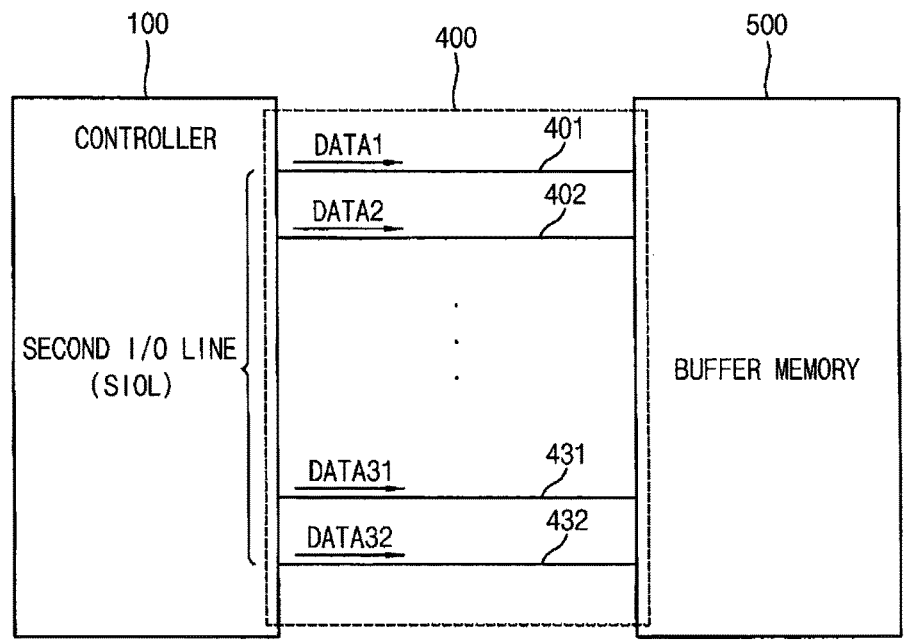
FIG. 9 is a diagram illustrating an example of a second input-output unit included in the solid state drive of FIG. 1.

FIG. 8 is a diagram illustrating an example of a first input-output unit included in the solid state drive of FIG. 1 and FIG. 9 is a diagram illustrating an example of a second input-output unit included in the solid state drive of FIG. 1.

Referring to FIGS. 8 and 9, a solid state drive 10 includes a controller 100, a mapping table 300 and a buffer memory 500. The controller 100 provides a logical address ADDR_L of data DATA through a first input-output unit 200 and provides the data DATA through a second input-output unit 400. The controller 100 is connected to the first input-output unit 200 and the second input-output unit 400. The first input-output unit 200 is different from the second input-output unit 400. The mapping table 300 maps the logical address ADDR_L of the data DATA to a physical address ADDR_P of the data DATA. The logical address ADDR_L is transferred through the first input-output unit 200. The mapping table 300 is connected to the controller 100 through the first input-output unit 200. The buffer memory 500 buffers the data DATA that is transferred through the second input-output unit 400. The buffer memory 500 is connected to the controller 100 through the second input-output unit 400.

In some example embodiments, the first input-output unit 200 may include one or more first input-output lines FIOL (e.g., 201, 202, 203, 204, 205, 206, 207, and 208 in FIG. 8) that transfer the logical address ADDR_L. The second input-output unit 400 may include a plurality of second input-output lines SIOL (e.g., 401, 402, . . . , 431, and 432 in FIG. 2) that transfer the data DATA. For example, the first input-output unit 200 that transfers the logical address ADDR_L may include one or more first input-output lines FIOL. The logical address ADDR_L may be 32 bits and the data DATA may be 4 KB. While the data DATA of 4 KB is transferred from the controller 100 to the buffer memory 500 through the second input-output unit 400, the logical address ADDR_L of 32 bits may be transferred from the controller 100 to the mapping table 300 through the first input-output unit 200. The first input-output lines FIOL may transfer 1st to 8th bits of the logical address ADDR_L of 32 bits. Next, the first input-output lines FIOL may transfer 9th to 16th bits of the logical address ADDR_L of 32 bits. Next, the first input-output lines FIOL may transfer 17th to 24th bits of the logical address ADDR_L of 32 bits. Next, the first input-output lines FIOL may transfer 25th to 32nd bits of the logical address ADDR_L of 32 bits.

While the data DATA of 4 KB is transferred from the controller 100 to the buffer memory 500 through the second input-output lines SIOL, each of the first input-output lines FIOL may transfer 4 bits that are included in the logical address ADDR_L from the controller 100 to the mapping table 300.

Figure 10:
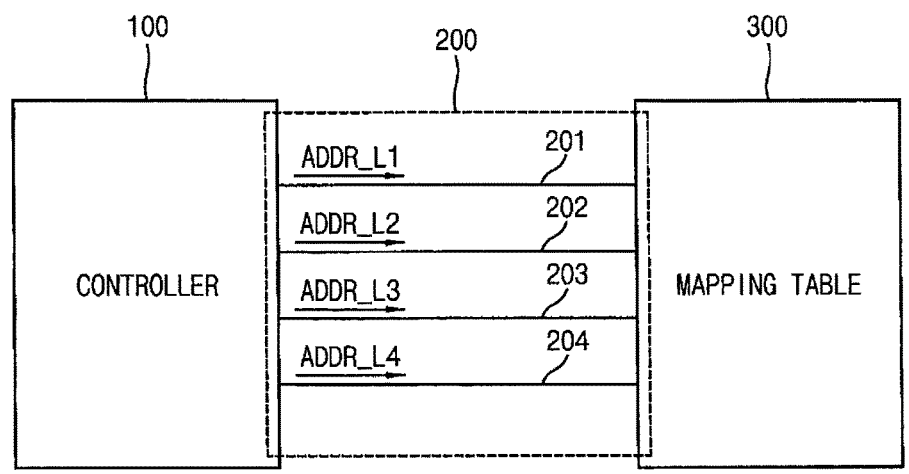
FIG. 10 is a diagram illustrating an example of a first input-output unit included in the solid state drive of FIG. 1.

FIG. 10 is a diagram illustrating an example of a first input-output unit included in the solid state drive of FIG. 1.

Referring to FIG. 10, a number of the first input-output lines FIOL may be different from a number of the plurality of the second input-output lines SIOL. In some example embodiments, a number of the first input-output lines FIOL may be less than a number of the plurality of the second input-output lines SIOL.

For example, the first input-output unit 200 that transfers the logical address ADDR_L may include the first input-output lines FIOL (e.g., 201, 202, 203, and 204 in FIG. 10). The logical address ADDR_L may be 32 bits and the data DATA may be 4 KB. While the data DATA of 4 KB is transferred from the controller 100 to the buffer memory 500 through the second input-output unit 400, the logical address ADDR_L of 32 bits may be transferred from the controller 100 to the mapping table 300 through the first input-output unit 200. The first input-output lines FIOL may transfer 1st to 4th bits of the logical address ADDR_L of 32 bits. Next, the first input-output lines FIOL may transfer 5th to 8th bits of the logical address ADDR_L of 32 bits. Next, the first input-output lines FIOL may transfer 9th to 12th bits of the logical address ADDR_L of 32 bits. Next, the first input-output lines FIOL may transfer 13th to 16th bits of the logical address ADDR_L of 32 bits. Next, the first input-output lines FIOL may transfer 17th to 20th bits of the logical address ADDR_L of 32 bits. Next, the first input-output lines FIOL may transfer 21st to 24th bits of the logical address ADDR_L of 32 bits. Next, the first input-output lines FIOL may transfer 25th to 28th bits of the logical address ADDR_L of 32 bits. Next, the first input-output lines FIOL may transfer 29th to 32nd bits of the logical address ADDR_L of 32 bits.

While the data DATA of 4 KB is transferred from the controller 100 to the buffer memory 500 through the second input-output lines SIOL, each of the first input-output lines FIOL may transfer 8 bits that are included in the logical address ADDR_L from the controller 100 to the mapping table 300.

Figures 11, 12:
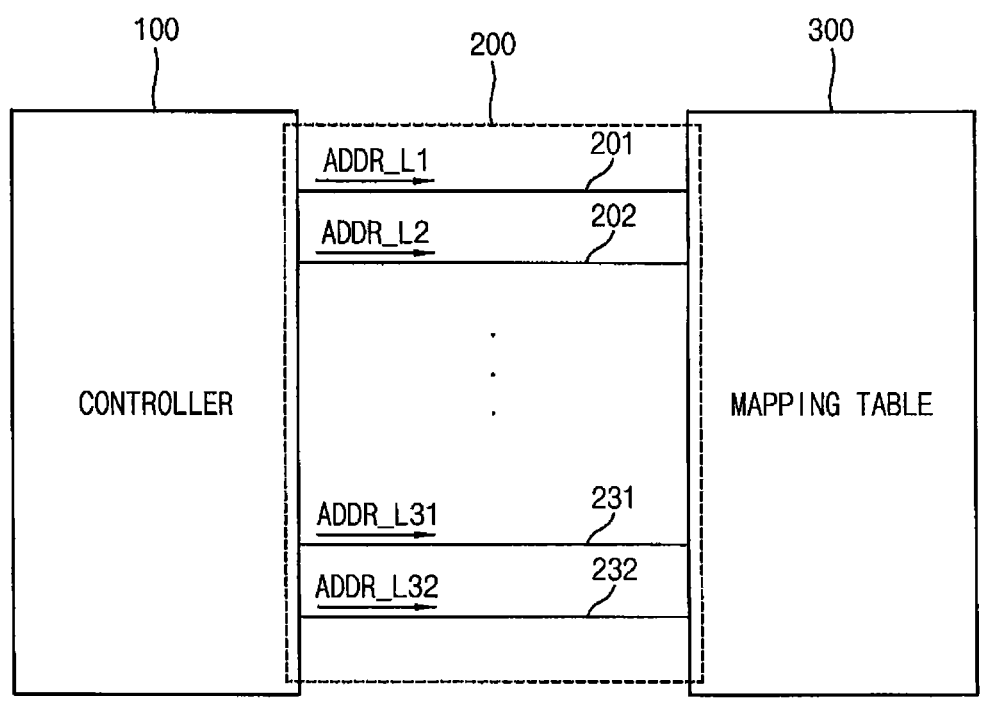
FIG. 11 is a table describing a number of first input-output lines according to an operation speed of the solid state drive of FIG. 1.
FIG. 12 is a diagram illustrating an example of a first input-output unit included in the solid state drive of FIG. 1.

FIG. 11 is a table describing a number of first input-output lines according to an operation speed of the solid state drive of FIG. 1.

Referring to FIG. 11, a number of the first input-output lines FIOL may be determined based on an operational speed of the solid state drive 10. If the operational speed of the solid state drive 10 is high, the solid state drive 10 may be implemented by increasing the first input-output lines FIOL. For example, the number of the first input-output lines FIOL may be 4, 8 or 16. In case the number of the first input-output lines FIOL is 4, the transfer speed of the logical address ADDR_L that is transferred from the controller 100 to the mapping table 300 through the first input-output unit 200 may be low. In case the number of the first input-output lines FIOL is 8, the transfer speed of the logical address ADDR_L that is transferred from the controller 100 to the mapping table 300 through the first input-output unit 200 may be high. In case the number of the first input-output lines FIOL is 16, the transfer speed of the logical address ADDR_L that is transferred from the controller 100 to the mapping table 300 through the first input-output unit 200 may be higher than the transfer speed of the logical address ADDR_L in case of 8 first input-output lines FIOL.

FIG. 12 is a diagram illustrating an example of a first input-output unit included in the solid state drive of FIG. 1.

Referring to FIG. 12, a solid state drive 10 includes a controller 100, a mapping table 300 and a buffer memory 500. The controller 100 provides a logical address ADDR_L of data DATA through a first input-output unit 200 and provides the data DATA through a second input-output unit 400. The controller 100 is connected to the first input-output unit 200 and the second input-output unit 400. The first input-output unit 200 is different from the second input-output unit 400. The mapping table 300 maps the logical address ADDR_L of the data DATA to a physical address ADDR_P of the data DATA. The logical address ADDR_L is transferred through the first input-output unit 200. The mapping table 300 is connected to the controller 100 through the first input-output unit 200. The buffer memory 500 buffers the data DATA that is transferred through the second input-output unit 400. The buffer memory 500 is connected to the controller 100 through the second input-output unit 400.

In some example embodiments, a number of the first input-output lines FIOL may be equal to a number of the plurality of the second input-output lines SIOL. The first input-output unit 200 may include the first input-output lines FIOL (e.g., 201, 202, . . . , 231, and 232 in FIG. 12). The logical address ADDR_L may be transferred from the controller 100 to the mapping table 300 through the first input-output lines FIOL. The second input-output unit 400 may include a plurality of second input-output lines SIOL. The data DATA may be transferred from the controller 100 to the buffer memory 500 through the second input-output lines SIOL. For example, the number of the first input-output lines FIOL may be 32. The number of the plurality of the second input-output lines SIOL may be 32. The logical address ADDR_L may be 32 bits. In case the logical address ADDR_L is 32 bits, the logical address ADDR_L of 32 bits may be transferred from the controller 100 to the mapping table 300 through 32 first input-output lines FIOL included in the first input-output unit 200 at once.

Figure 13:
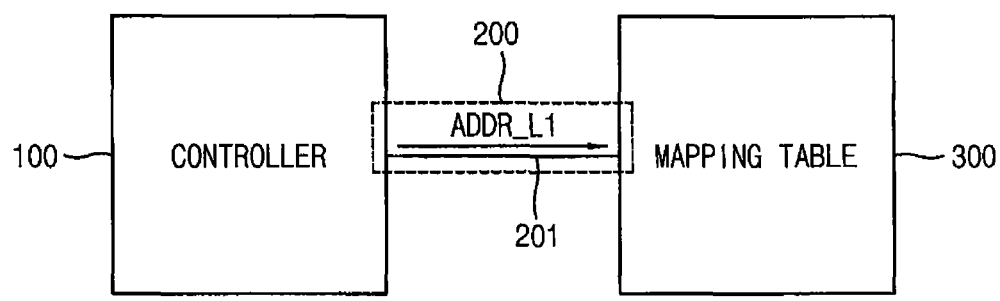
FIG. 13 is a diagram illustrating an example of a first input-output unit included in the solid state drive of FIG. 1.

FIG. 13 is a diagram illustrating an example of a first input-output unit included in the solid state drive of FIG. 1.

Referring to FIG. 13, a number of the first input-output lines FIOL may be one. For example, a number of the first input-output lines FIOL included in the first input-output unit 200 may be one. The logical address ADDR_L may be 32 bits and the data DATA may be 4 KB. In case the logical address ADDR_L is 32 bits, the logical address ADDR_L of 32 bits may be transferred from the controller 100 to the mapping table 300 through the one first input-output line FIOL. In this case, the logical address ADDR_L may be sequentially transferred one bit by one bit through the one first input-output line. For example, while the data DATA of 4 KB is transferred from the controller 100 to the buffer memory 500 through the second input-output unit 400, the logical address ADDR_L of 32 bits may be transferred from the controller 100 to the mapping table 300 through the one first input-output line included in the first input-output unit 200.

The solid state drive 10 according to example embodiments may increase an operation speed by separating the first input-output unit 200 that connects the controller 100 and the mapping table 300 from the second input-output unit 400 that connects the controller 100 and the buffer memory 500.

Figure 14:
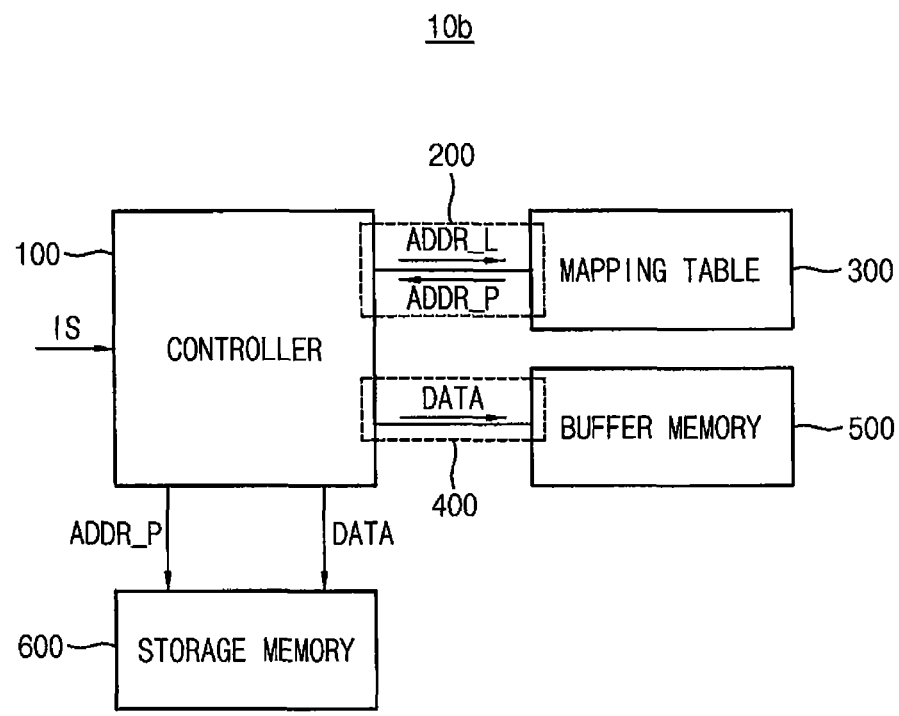
FIG. 14 is a block diagram illustrating a solid state drive according to example embodiments.

FIG. 14 is a block diagram illustrating a solid state drive according to example embodiments.

Referring to FIG. 14, a solid state drive 10 includes a controller 100, a mapping table 300, a buffer memory 500 and a storage memory 600. The controller 100 provides a logical address ADDR_L of data DATA through a first input-output unit 200 and provides the data DATA through a second input-output unit 400. The controller 100 is connected to the first input-output unit 200 and the second input-output unit 400. The first input-output unit 200 is different from the second input-output unit 400.

The mapping table 300 maps the logical address ADDR_L of the data DATA to a physical address ADDR_P of the data DATA. The logical address ADDR_L is transferred through the first input-output unit 200. The mapping table 300 is connected to the controller 100 through the first input-output unit 200. The mapping table 300 may be implemented using a volatile memory. For example, the mapping table 300 may be implemented using a DRAM.

The buffer memory 500 is connected to the controller 100 through the second input-output unit 400. The buffer memory 500 may be used to store the data DATA, that is transferred from outside at high speed, to the storage memory 600 that is operated at low speed. The buffer memory 500 may buffer the data DATA that is transferred through the second input-output unit 400. The buffer memory 500 may be implemented using the volatile memory. For example, the buffer memory 500 may be implemented using a DRAM.

For example, the first input-output unit 200 and the second input-output unit 400 may be separated in the solid state drive 10. The mapping table 300 that is connected to the first input-output unit 200 may be operated at low speed. The buffer memory 500 that is connected to the second input-output unit 400 may be operated at high speed. The logical address ADDR_L of the data DATA may be transferred from the controller 100 to the mapping table 300 through the first input-output unit 200. The data DATA may be transferred from the controller 100 to the buffer memory 500 through the second input-output unit 400.

The storage memory 600 stores the data DATA that is transferred from the buffer memory 500 through the memory controller 100. For example, the physical address ADDR_P of the data DATA may be one of a physical address of the storage memory 600. The data DATA may be stored in the storage memory 600 using the physical address ADDR_P of the storage memory 600 that is transferred from the controller 100. The physical address ADDR_P of the storage memory 600 that is transferred from the controller 100 may be transferred from the mapping table 300 to the controller 100. The data DATA may be stored in the physical address ADDR_P of the storage memory 600 that is transferred from the controller 100.

In the read operation of the solid state drive 10, the controller 100 may provide the logical address ADDR_L of the read data DATA through the first input-output unit 200. The mapping table 300 may be connected to the controller 100 through the first input-output unit 200. The mapping table 300 may map the logical address ADDR_L of the read data DATA that is transferred through the first input-output unit 200 to the physical address ADDR_P of the read data DATA. The physical address ADDR_P of the storage memory 600 that is transferred from the controller 100 may be transferred from the mapping table 300 to the controller 100. The read data DATA corresponding to the physical address ADDR_P of the storage memory 600 may be transferred to the controller 100. The read data DATA that is transferred to the controller 100 may be provided outside of the solid stat drive after the read data DATA is buffered in the buffer memory 500.

The solid state drive 10 according to example embodiments may increase an operation speed by separating the first input-output unit 200 that connects the controller 100 and the mapping table 300 from the second input-output unit 400 that connects the controller 100 and the buffer memory 500.

In some example embodiments, the controller 100 may receive the physical address ADDR_P of the data DATA from the mapping table 300 through the first input-output unit 200 and provide the physical address ADDR_P to the storage memory 600. The controller 100 may receive the data DATA from the buffer memory 500 through the second input-output unit 400 and provide the data DATA to the storage memory 600. The data DATA may be stored in the physical address ADDR_P of the storage memory 600.

In some example embodiments, the first input-output unit 200 may include one or more first input-output lines FIOL. The second input-output unit 400 may include a plurality of second input-output lines SIOL. A number of first input-output lines FIOL included in the first input-output unit 200 may be less than or equal to a number of second input-output lines SIOL included in the second input-output unit 400.

In some example embodiments, a number of first input-output lines FIOL included in the first input-output unit 200 may be determined based on an operational speed of the solid state drive 10. If the operational speed of the solid state drive 10 is high, the solid state drive 10 may be implemented by increasing the first input-output lines FIOL. For example, the number of the first input-output lines FIOL may be 4, 8 or 16. In case the number of the first input-output lines FIOL is 4, the transfer speed of the logical address ADDR_L that is transferred from the controller 100 to the mapping table 300 through the first input-output unit 200 may be low. In case the number of the first input-output lines FIOL is 8, the transfer speed of the logical address ADDR_L that is transferred from the controller 100 to the mapping table 300 through the first input-output unit 200 may be high. In case the number of the first input-output lines FIOL is 16, the transfer speed of the logical address ADDR_L that is transferred from the controller 100 to the mapping table 300 through the first input-output unit 200 may be higher than the transfer speed of the logical address ADDR_L in case of 8 first input-output lines FIOL.

In addition, in some embodiments of the present inventive concept, a three dimensional (3D) memory array may be provided in the storage memory 600. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array. In some example embodiments of the present inventive concept, the 3D memory array includes NAND strings that are vertically oriented such that at least one memory cell is located over another memory cell. The at least one memory cell may comprise a charge trap layer. The following patent documents, which are hereby incorporated by reference, describe suitable configurations for the 3D memory arrays, in which the three-dimensional memory array is configured as a plurality of levels, with word-lines and/or bit-lines shared between levels: U.S. Pat. Nos. 7,679,133; 8,553,466; 8,654,587; 8,559,235; and US Pat. Pub. No. 2011/0233648.

Figure 15:
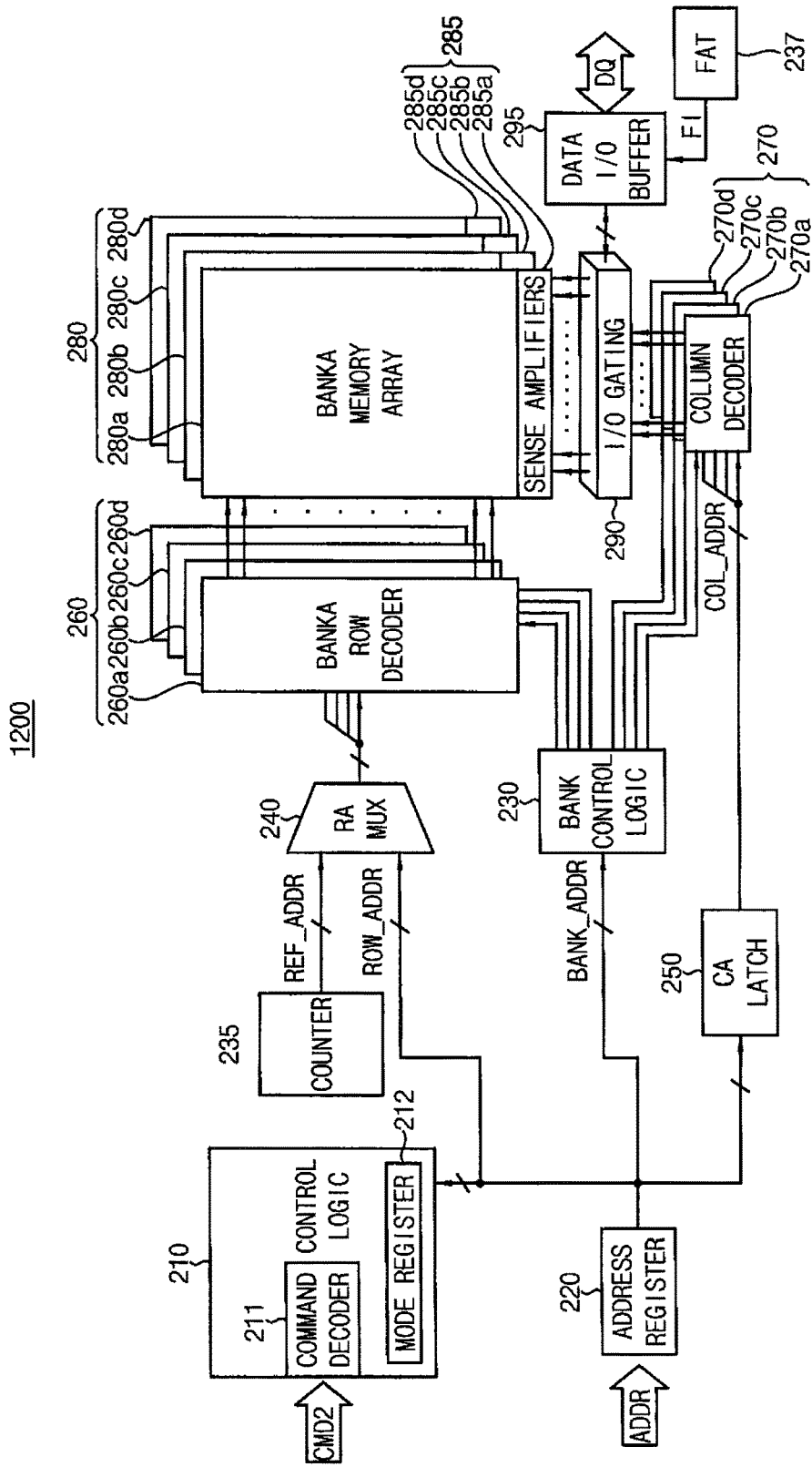
FIG. 15 is a block diagram illustrating a memory device included in the solid state drive of FIG. 14.

FIG. 15 is a block diagram illustrating a memory device included in the solid state drive of FIG. 14.

Referring to FIG. 15, the main memory 1200 includes a control logic 210, an address register 220, a bank control logic 230, a row address multiplexer 240, a refresh counter 235, a fail address table 237, a column address latch 250, a row decoder 260, a column decoder 270, a memory cell array 280, a sense amplifier unit 285, an input/output gating circuit 290 and a data input/output buffer 295. In some embodiments, the memory device 1200 may be a dynamic random access memory (DRAM), such as a double data rate synchronous dynamic random access memory (DDR SDRAM), a low power double data rate synchronous dynamic random access memory (LPDDR SDRAM), a graphics double data rate synchronous dynamic random access memory (GDDR SDRAM), a Rambus dynamic random access memory (RDRAM), etc.

The memory cell array 280 may include first through fourth bank arrays 280a, 280b, 280c and 280d. The row decoder 260 may include first through fourth bank row decoders 260a, 260b, 260c and 260d respectively coupled to the first through fourth bank arrays 280a, 280b, 280c and 280d, the column decoder 270 may include first through fourth bank column decoders 270a, 270b, 270c and 270d respectively coupled to the first through fourth bank arrays 280a, 280b, 280c and 280d, and the sense amplifier unit 285 may include first through fourth bank sense amplifiers 285a, 285b, 285c and 285d respectively coupled to the first through fourth bank arrays 280a, 280b, 280c and 280d. The first through fourth bank arrays 280a, 280b, 280c and 280d, the first through fourth bank row decoders 260a, 260b, 260c and 260d, the first through fourth bank column decoders 270a, 270b, 270c and 270d and the first through fourth bank sense amplifiers 285a, 285b, 285c and 285d may form first through fourth banks. The main memory 1200 may include any number of banks.

The address register 220 may receive an address ADDR including a bank address BANK_ADDR, a row address ROW_ADDR and a column address COL_ADDR from a memory controller. The address register 220 may provide the received bank address BANK_ADDR to the bank control logic 230, may provide the received row address ROW_ADDR to the row address multiplexer 240, and may provide the received column address COL_ADDR to the column address latch 250.

The bank control logic 230 may generate bank control signals in response to the bank address BANK_ADDR. One of the first through fourth bank row decoders 260a, 260b, 260c and 260d corresponding to the bank address BANK_ADDR may be activated in response to the bank control signals, and one of the first through fourth bank column decoders 270a, 270b, 270c and 270d corresponding to the bank address BANK_ADDR may be activated in response to the bank control signals.

The row address multiplexer 240 may receive the row address ROW_ADDR from the address register 220, and may receive a refresh row address REF_ADDR from the refresh counter 235. The row address multiplexer 240 may selectively output the row address ROW_ADDR or the refresh row address REF_ADDR. A row address output from the row address multiplexer 240 may be applied to the first through fourth bank row decoders 260a, 260b, 260c and 260d.

The activated one of the first through fourth bank row decoders 260a, 260b, 260c and 260d may decode the row address output from the row address multiplexer 240, and may activate a word line corresponding to the row address. For example, the activated bank row decoder may apply a word line driving voltage to the word line corresponding to the row address.

The column address latch 250 may receive the column address COL_ADDR from the address register 220, and may temporarily store the received column address COL_ADDR. In some embodiments, in a burst mode, the column address latch 250 may generate column addresses that increment from the received column address COL_ADDR. The column address latch 250 may apply the temporarily stored or generated column address to the first through fourth bank column decoders 270a, 270b, 270c and 270d.

The activated one of the first through fourth bank column decoders 270a, 270b, 270c and 270d may decode the column address COL_ADDR output from the column address latch 250, and may control the input/output gating circuit 290 to output data corresponding to the column address COL_ADDR.

The input/output gating circuit 290 may include circuitry for gating input/output data. The input/output gating circuit 290 may further include an input data mask logic, read data latches for storing data output from the first through fourth bank arrays 280a, 280b, 280c and 280d, and write drivers for writing data to the first through fourth bank arrays 280a, 280b, 280c and 280d.

Data DQ to be read from one bank array of the first through fourth bank arrays 280a, 280b, 280c and 280d may be sensed by a sense amplifier coupled to the one bank array, and may be stored in the read data latches. The data DQ stored in the read data latches may be provided to the memory controller via the data input/output buffer 295. Data DQ to be written to one bank array of the first through fourth bank arrays 280a, 280b, 280c and 280d may be provide from the memory controller to the data input/output buffer 295. The data DQ provided to the data input/output buffer 295 may be written to the one array bank via the write drivers.

The control logic 210 may control operations of the memory device 1200. For example, the control logic 210 may generate control signals for the memory device 1200 to perform a write operation or a read operation. The control logic 210 may include a command decoder 211 that decodes a command CMD received from the memory controller and a mode register 212 that sets an operation mode of the memory device 201. For example, the command decoder 211 may generate the control signals corresponding to the command CMD by decoding a write enable signal (/WE), a row address strobe signal (/RAS), a column address strobe signal (/CAS), a chip select signal (/CS), etc. The command decoder 211 may further receive a clock signal (CLK) and a clock enable signal (/CKE) for operating the memory device 1200 in a synchronous manner.

Figure 16:
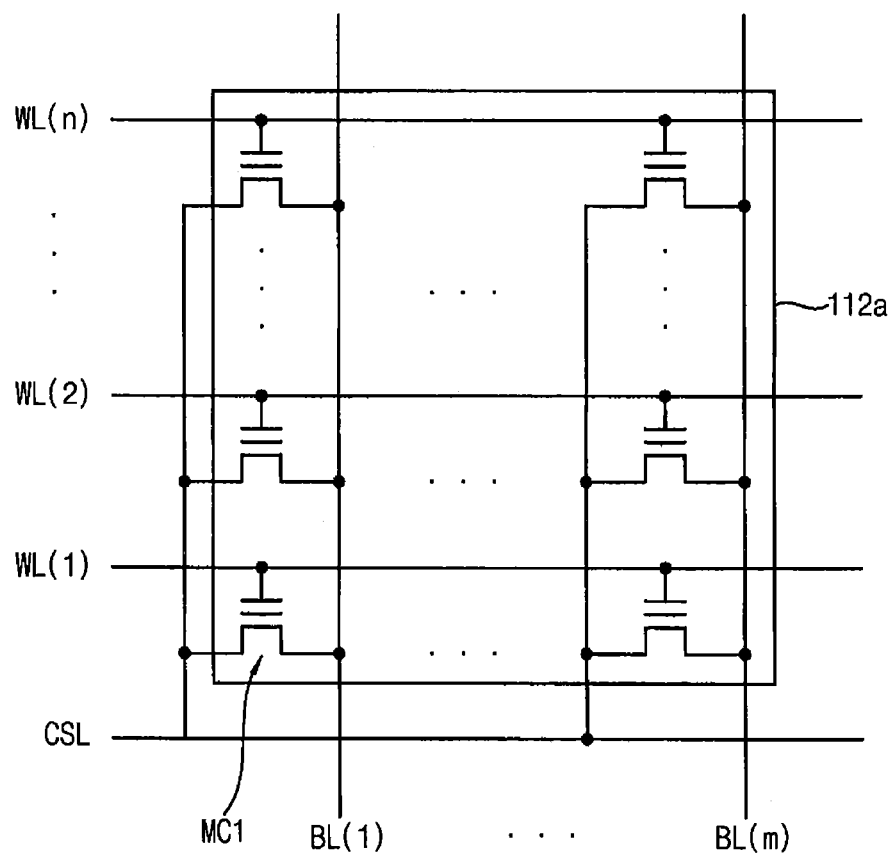
FIG. 16 is a diagram illustrating an example of a storage memory included in the solid state drive of FIG. 14.
Figure 17:
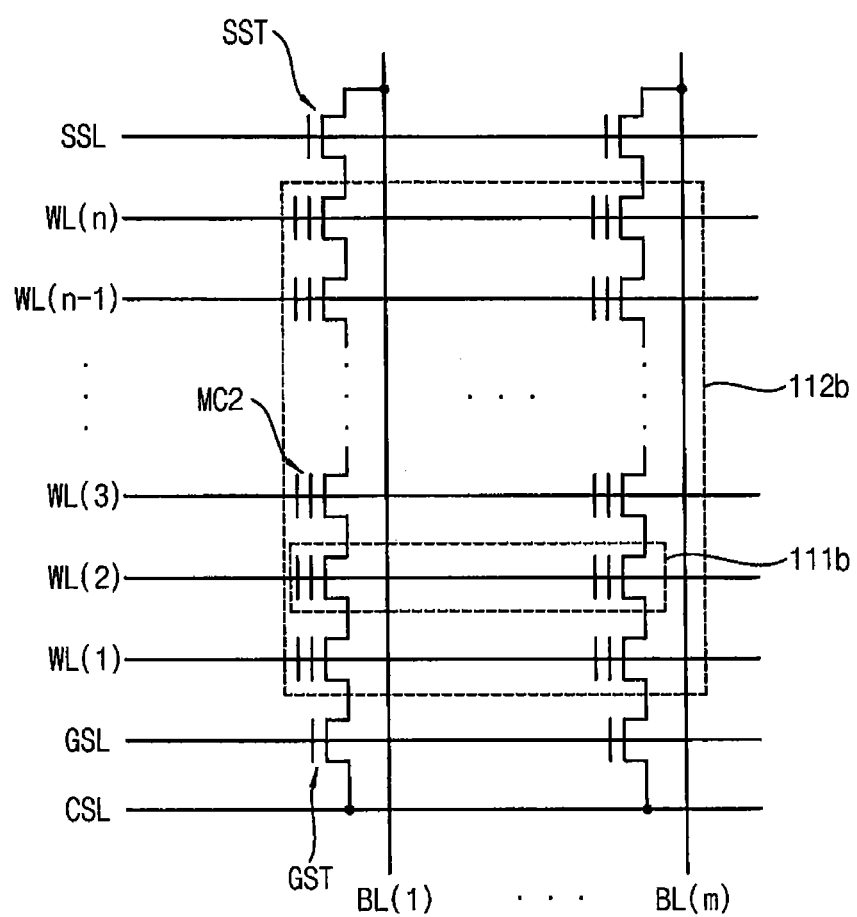
FIG. 17 is a diagram illustrating an example of a storage memory included in the solid state drive of FIG. 14.
Figure 18:
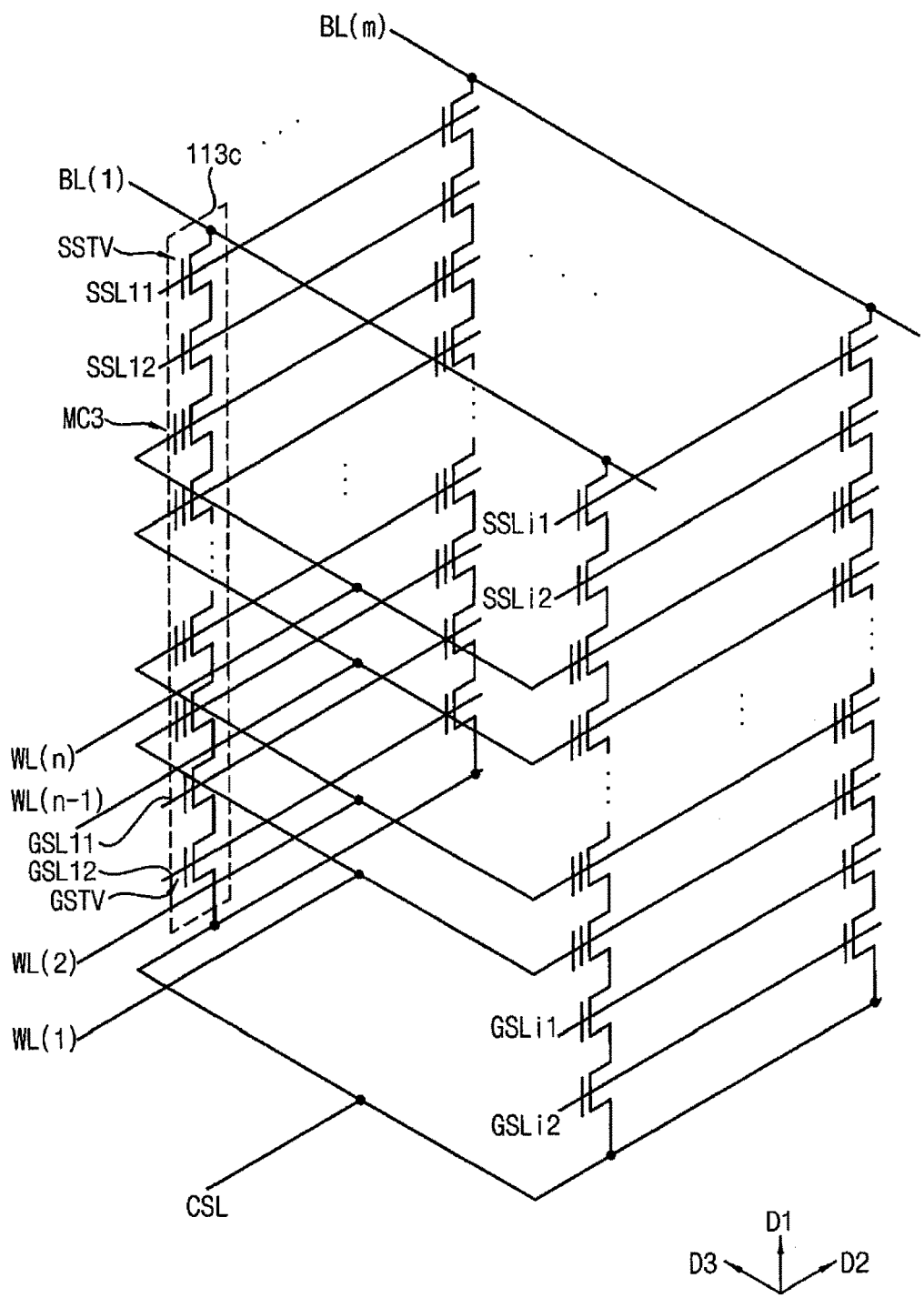
FIG. 18 is a diagram illustrating an example of a storage memory included in the solid state drive of FIG. 14.

FIG. 16 is a diagram illustrating an example of a storage memory 600 included in the solid state drive of FIG. 14, FIG. 17 is a diagram illustrating an example of a storage memory 600 included in the solid state drive of FIG. 14 and FIG. 18 is a diagram illustrating an example of a storage memory 600 included in the solid state drive of FIG. 14.

FIG. 16 is a circuit diagram of one example of a memory cell array in a NOR flash memory device, FIG. 17 is a circuit diagram of one example of a memory cell array in a NAND flash memory device, and FIG. 18 is a circuit diagram of one example of a memory cell array in a vertical flash memory device.

Referring to FIG. 16, a memory cell array 110a may include multiple memory cells MC1. The memory cells MC1 located in the same row may be disposed in parallel between one of bit lines BL(1), . . . , BL(m) and a common source line CSL and may be connected in common to one of word lines WL(1), WL(2), . . . , WL(n)). For example, the memory cells MC1 located in the first row may be disposed in parallel between the first bit line WL(1) and the common source line CSL. The gate electrodes of the memory cells MC1 disposed in the first row may be connected in common to the first word line WL(1). The memory cells MC1 may be controlled according to a level of a voltage applied to the word lines WL(1), . . . , WL(n). The NOR flash memory device comprising the memory cell array 110a may perform the write and read operations in units of byte or words and may perform the erase operation in units of block.

Referring to FIG. 17, a memory cell array 110b comprises string selection transistors SST, ground selection transistors GST and memory cells MC2. The string selection transistors SST are connected to bit lines BL(1), . . . , BL(m), and the ground selection transistors GST are connected to a common source line CSL. The memory cells MC2 disposed in the same row are disposed in series between one of the bit lines BL(1), . . . , BL(m) and the common source line CSL, and the memory cells MC2 disposed in the same column are connected in common to one of word lines WL(1), WL(2), WL(3), . . . , WL(n−1), WL(n). That is the memory cells MC2 are connected in series between the string selection transistors SST and the ground selection transistors GST, and the word lines of 16, 32, or 64 are disposed between a string selection line SSL and a ground selection line GSL.

The string selection transistors SST are connected to the string selection line SSL such that the string selection transistors SST may be controlled according to a level of the voltage applied from the string selection line SSL thereto. Memory cells MC2 may be controlled according to a level of a voltage applied to the word lines WL(1), . . . , WL(n).

The NAND flash memory device comprising the memory cell array 110b performs write and read operations in units of page 111b, and it performs erase operations in units of block 112b. According to some embodiments, each of the page buffers may be connected to even and odd bit lines one by one. In this case, the even bit lines form an even page, the odd bit lines form an odd page, and the even and odd pages may perform by turns and sequentially the write operation into memory cells MC2.

Referring to FIG. 18, a memory cell array 110c comprises multiple strings 113c having a vertical structure. The strings 113c are arranged along the second direction to form a string row. Multiple string rows are arranged along the third direction to form a string array. Each of the strings 113c comprises ground selection transistors GSTV, memory cells MC3, and string selection transistors SSTV, which are disposed in series in the first direction between bit lines BL(1), . . . , BL(m) and a common source line CSL.

The ground selection transistors GSTV are connected to ground selection lines GSL11, GSL12, . . . , GSLi1, GSLi2, respectively, and the string selection transistors SSTV are connected to string selection lines SSL11, SSL12, . . . , SSLi1, SSLi2, respectively. The memory cells MC3 disposed in the same layer are connected in common to one of word lines WL(1), WL(2), . . . , WL(n−1), WL(n). The ground selection lines GSL11, . . . , GSLi2 and the string selection lines SSL11, SSLi2 extend in the second direction and are formed along the third direction. The word lines WL(1), . . . , WL(n) extend in the second direction and are formed along the first and third directions. The bit lines BL(1), . . . , BL(m) extend in the third direction and are formed along the second direction. The memory cells MC3 are controlled according to a level of a voltage applied to the word lines WL(1), . . . , WL(n).

Because the vertical flash memory device comprising the memory cell array 110c comprises NAND flash memory cells, like the NAND flash memory device, the vertical flash memory device performs the write and read operations in units of pages and the erase operation in units of block.

In some embodiments, two string selection transistors SSTV in one string 113c are connected to one of the string selection lines SSL11, SSL12, . . . , SSLi1, SSLi2 and two ground selection transistors GSTV in one string are connected to one of the ground selection lines GSL11, GSL12, . . . , GSLi1, GSLi2. Further, according to some embodiments, one string 113c comprises one string selection transistor SSTV and one ground selection transistor GSTV.

Figure 19:
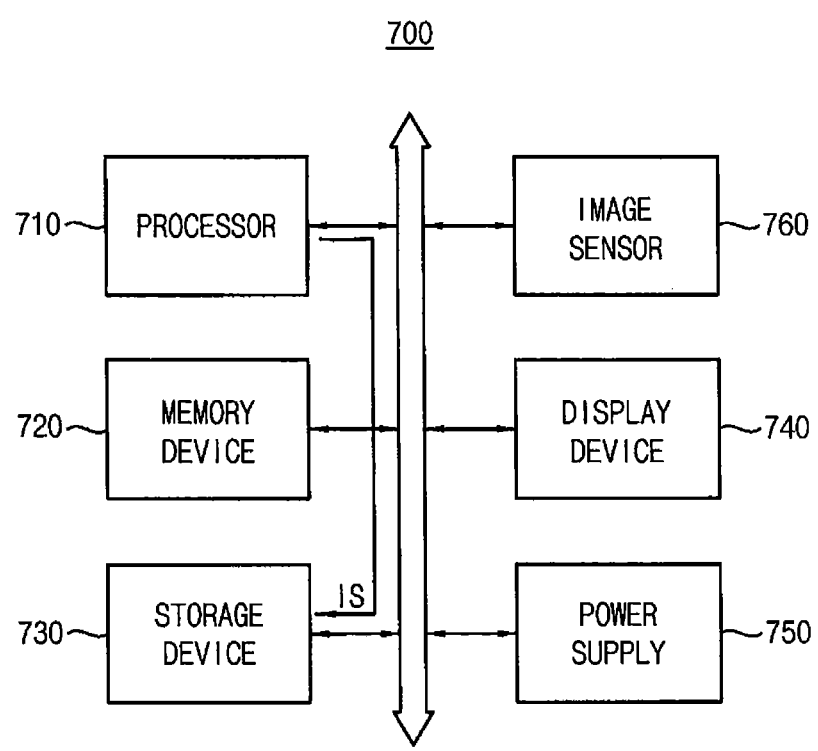
FIG. 19 is a block diagram illustrating a mobile device including the solid state drive according to example embodiments.
Figure 20:
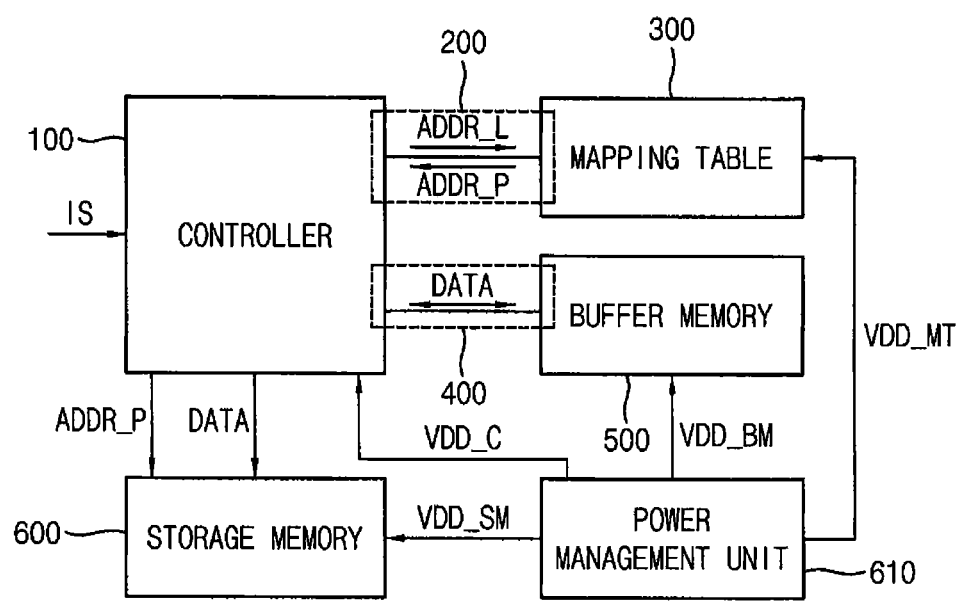
FIG. 20 is a block diagram illustrating a solid state drive included in the mobile device of FIG. 19.

FIG. 19 is a block diagram illustrating a mobile device including a solid state drive according to example embodiments, and FIG. 20 is a block diagram illustrating a solid state drive included in the mobile device of FIG. 19.

Referring to FIG. 19, a computing system 700 may include a processor 710, a memory device 720, a storage device 730, a display device 740, a power supply 750 and an image sensor 760. The computing system 700 may further include ports that communicate with a video card, a sound card, a memory card, a USB device, other electronic devices, etc.

The processor 710 may perform various calculations or tasks. According to some embodiments, the processor 710 may be a microprocessor or a CPU. The processor 710 may communicate with the memory device 720, the storage device 730, and the display device 740 via an address bus, a control bus, and/or a data bus. In some embodiments, the processor 710 may be coupled to an extended bus, such as a Peripheral Component Interconnection (PCI) bus. The memory device 720 may store data for operating the computing system 700. For example, the memory device 720 may be implemented with a dynamic random access memory (DRAM) device, a mobile DRAM device, a static random access memory (SRAM) device, a phase-change random access memory (PRAM) device, a ferroelectric random access memory (FRAM) device, a resistive random access memory (RRAM) device, and/or a magnetic random access memory (MRAM) device. The memory device 720 includes the data loading circuit according to example embodiments. The storage device 730 may include a solid state drive (SSD), a hard disk drive (HDD), a CD-ROM, etc. The computing system 700 may further include an input device such as a touchscreen, a keyboard, a keypad, a mouse, etc., and an output device such as a printer, a display device, etc. The power supply 750 supplies operation voltages for the computing system 700.

The image sensor 760 may communicate with the processor 710 via the buses or other communication links. The image sensor 760 may be integrated with the processor 710 in one chip, or the image sensor 760 and the processor 710 may be implemented as separate chips.

At least a portion of the computing system 700 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP). The computing system 700 may be a digital camera, a mobile phone, a smart phone, a portable multimedia player (PMP), a personal digital assistant (PDA), a computer, etc.

Referring to FIGS. 19 and 20, a computing system 700 includes a processor 710 and a solid state drive 10c. The processor 710 provides an input signal IS that includes data DATA and a logical address ADDR_L of the data DATA. The solid state drive 10c receives the input signal IS and stores the data DATA to a physical address ADDR_P of the data DATA. The solid state drive 10c includes a controller 100, a mapping table 300 and a buffer memory 500.

The controller 100 provides a logical address ADDR_L of data DATA through a first input-output unit 200 and provides the data DATA through a second input-output unit 400. The controller 100 is connected to the first input-output unit 200 and the second input-output unit 400. The first input-output unit 200 is different from the second input-output unit 400. In some embodiments, the first input-output unit 200 is physically separated from the second input-output unit 400.

The mapping table 300 maps the logical address ADDR_L of the data DATA to a physical address ADDR_P of the data DATA. The logical address ADDR_L is transferred through the first input-output unit 200. The mapping table 300 is connected to the controller 100 through the first input-output unit 200. The mapping table 300 may be implemented using a volatile memory. For example, the mapping table 300 may be implemented using a DRAM.

The buffer memory 500 buffers the data DATA that is transferred through the second input-output unit 400. The buffer memory 500 is connected to the controller 100 through the second input-output unit 400. The buffer memory 500 may be implemented using the volatile memory. For example, the buffer memory 500 may be implemented using DRAM.

For example, the first input-output unit 200 and the second input-output unit 400 may be separated in the solid state drive 10c. The mapping table 300 that is connected to the first input-output unit 200 may be operated at low speed. The buffer memory 500 that is connected to the second input-output unit 400 may be operated at high speed. The logical address ADDR_L of the data DATA may be transferred from the controller 100 to the mapping table 300 through the first input-output unit 200. The data DATA may be transferred from the controller 100 to the buffer memory 500 through the second input-output unit 400.

The storage memory 600 stores the data DATA that is transferred from the buffer memory 500 through the controller 100. For example, the physical address ADDR_P of the data DATA may be one of a physical address of the storage memory 600. The data DATA may be stored in the storage memory 600 using the physical address ADDR_P of the storage memory 600 that is transferred from the controller 100. The physical address ADDR_P of the storage memory 600 that is transferred from the controller 100 may be transferred from the mapping table 300 to the controller 100. The data DATA may be stored in the physical address ADDR_P of the storage memory 600 that is transferred from the controller 100.

Figure 21:
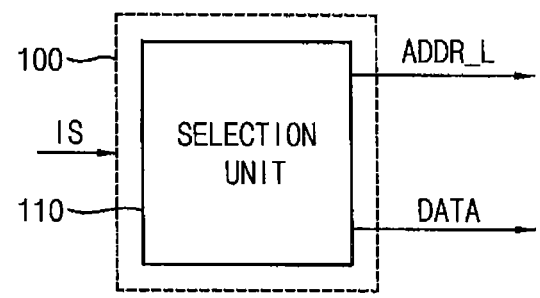
FIG. 21 is a block diagram illustrating an example of a controller included in the solid state drive of FIG. 20.

FIG. 21 is a block diagram illustrating an example of a controller included in the solid state drive of FIG. 20.

Referring to FIG. 21, the controller 100 may include a selection unit 110 that separate the data DATA from the logical address ADDR_L from an input signal IS. The input signal IS may include the data DATA and the logical address ADDR_L. For example, the input signal IS may include the data DATA and the logical address ADDR_L. In the solid state drive 10 according to example embodiments, because the first input-output unit 200 transferring the logical address ADDR_L and the second input-output unit 400 transferring the data DATA are separated, the selection unit 110 included in the controller 100 may separately provide the data DATA and the logical address ADDR_L included in the input signal IS.

The selection unit 110 may provide the logical address ADDR_L to the mapping table 300 through the first input-output unit 200. For example, the selection unit 110 may provide the logical address ADDR_L to the first input-output unit 200 by selecting the logical address ADDR_L among the data DATA and the logical address ADDR_L included in the input signal IS. The logical address ADDR_L that is provided to the first input-output unit 200 may be transferred to the mapping table 300. The selection unit 110 may provide the data DATA to the buffer memory 500 through the second input-output unit 400. For example, the selection unit 110 may provide the data DATA to the second input-output unit 400 by selecting the data DATA among the data DATA and the logical address ADDR_L included in the input signal IS. The data that is provided to the second input-output unit 400 may be transferred to the buffer memory 500.

In some example embodiments, the solid state drive 10c of FIG. 20 may further include a power management unit 610 that supplies a power supply voltage to each of the controller 100, the buffer memory 500 and the mapping table 300. For example, the power management unit may provide the power supply voltages VDD_C, VDD_SM, VDD_BM, VDD_MT that are used in the solid state drive 10c. In the solid state drive 10c according to example embodiments, the mapping table 300 connected to the first input-output unit 200 and the buffer memory 500 connected to the second input-output unit 400 may be separated (e.g., physically separated). In case the mapping table 300 and the buffer memory 500 are separated, the power management unit may provide the power supply voltages VDD_C, VDD_SM, VDD_BM, VDD_MT to each of the mapping table 300 and the buffer memory 500 to operate the mapping table 300 and the buffer memory 500.

The solid state drive 10c according to example embodiments may increase an operation speed by separating the first input-output unit 200 that connects the controller 100 and the mapping table 300 from the second input-output unit 400 that connects the controller 100 and the buffer memory 500.

Figure 22:
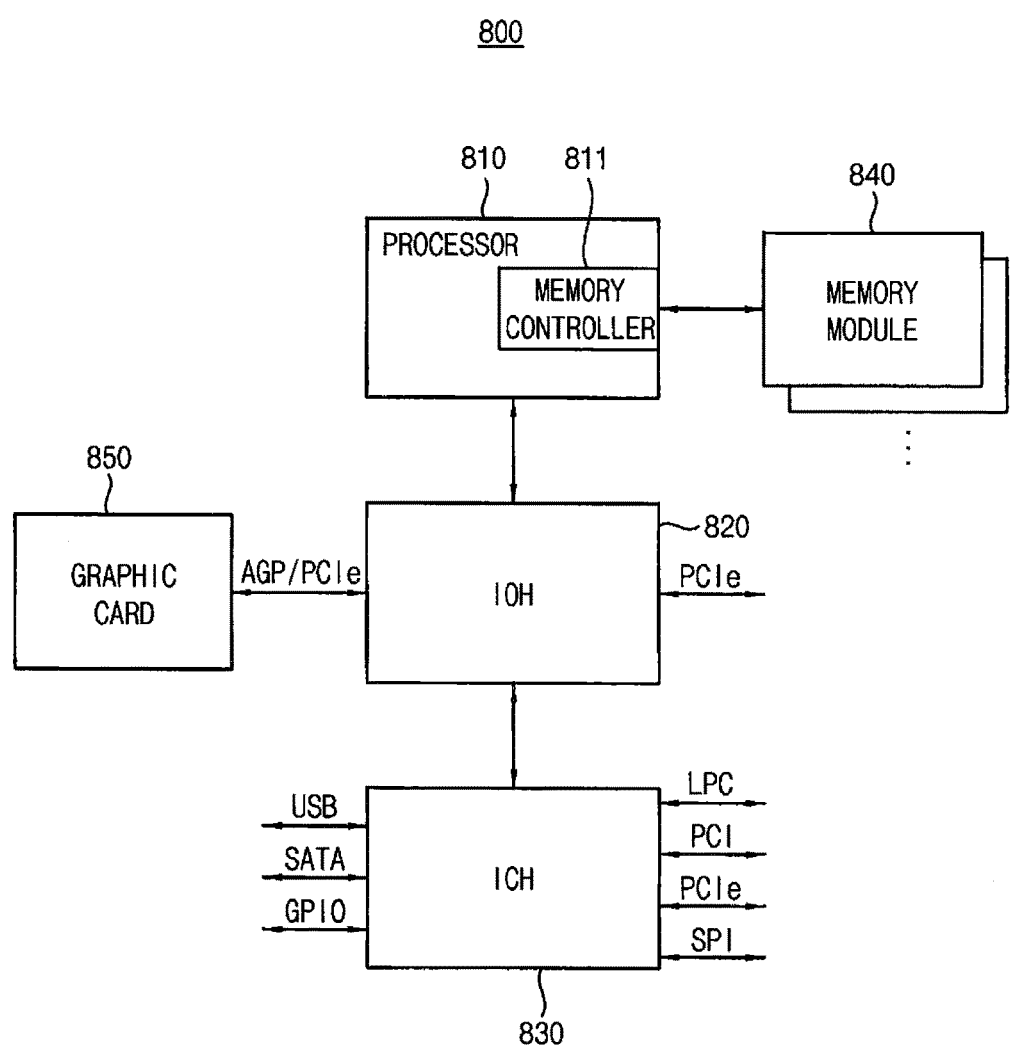
FIG. 22 is a block diagram illustrating a computing system according to example embodiments.

FIG. 22 is a block diagram illustrating a computing system according to example embodiments.

Referring to FIG. 22, a computing system 800 includes a processor 810, an input/output hub (IOH) 820, an input/output controller hub (ICH) 830, at least one memory module 840 and a graphics card 850. In some embodiments, the computing system 800 may be a personal computer (PC), a server computer, a workstation, a laptop computer, a mobile phone, a smart phone, a personal digital assistant (PDA), a portable multimedia player (PMP), a digital camera), a digital television, a set-top box, a music player, a portable game console, a navigation system, etc.

The processor 810 may perform various computing functions, such as executing specific software for performing specific calculations or tasks. For example, the processor 810 may be a microprocessor, a central process unit (CPU), a digital signal processor, or the like. In some embodiments, the processor 810 may include a single core or multiple cores. For example, the processor 810 may be a multi-core processor, such as a dual-core processor, a quad-core processor, a hexa-core processor, etc. The computing system 800 may include a plurality of processors 810. The processor 810 may include an internal or external cache memory.

The processor 810 may include a memory controller 811 for controlling operations of the memory module 840. The memory controller 811 included in the processor 810 may be referred to as an integrated memory controller (IMC). A memory interface between the memory controller 811 and the memory module 840 may be implemented with a single channel including a plurality of signal lines, or may be implemented with multiple channels, to each of which at least one memory module 840 may be coupled. In some embodiments, the memory controller 811 may be located inside the input/output hub 820, which may be referred to as memory controller hub (MCH).

The memory module 840 may include a plurality of memory devices that store data provided from the memory controller 811 and a buffer chip that manages overall operation of the memory devices. Each of the memory devices may store data processed by the processor (e.g., CPU) 810, or may operate as a working memory. Each of the memory devices may be a dynamic random access memory, such as DDR SDRAM, LPDDR SDRAM, GDDR SDRAM, RDRAM, etc. The buffer chip manages operation of the memory devices.

The input/output hub 820 may manage data transfer between the processor 810 and devices, such as the graphics card 850. The input/output hub 820 may be coupled to the processor 810 via various interfaces. For example, the interface between the processor 810 and the input/output hub 820 may be a front side bus (FSB), a system bus, a HYPERTRANSPORT, a lightning data transport (LDT), a QuickPath interconnect (QPI), a common system interface (CSI), etc. In some embodiments, the computing system 800 may include a plurality of input/output hubs. The input/output hub 820 may provide various interfaces with the devices. For example, the input/output hub 820 may provide an accelerated graphics port (AGP) interface, a Peripheral Component Interface-Express (PCIe), a communications streaming architecture (CSA) interface, etc.

The graphics card 850 may be coupled to the input/output hub 820 via AGP or Peripheral Component Interface-Express (PCIe). The graphics card 850 may control a display device for displaying an image. The graphics card 850 may include an internal processor for processing image data and an internal memory device. In some embodiments, the input/output hub 820 may include an internal graphics device along with or instead of the graphics card 850 outside the graphics card 850. The graphics device included in the input/output hub 820 may be referred to as integrated graphics. Further, the input/output hub 820 including the internal memory controller and the internal graphics device may be referred to as a graphics and memory controller hub (GMCH).

The input/output controller hub 830 may perform data buffering and interface arbitration to efficiently operate various system interfaces. The input/output controller hub 830 may be coupled to the input/output hub 820 via an internal bus, such as a direct media interface (DMI), a hub interface, an enterprise Southbridge interface (ESI), Peripheral Component Interface-Express (PCIe), etc. The input/output controller hub 830 may provide various interfaces with peripheral devices. For example, the input/output controller hub 830 may provide a universal serial bus (USB) port, a serial advanced technology attachment (SATA) port, a general purpose input/output (GPIO), a low pin count (LPC) bus, a serial peripheral interface (SPI), Peripheral Component Interconnection (PCI), Peripheral Component Interface-Express (PCIe), etc.

In some embodiments, the processor 810, the input/output hub 820 and the input/output controller hub 830 may be implemented as separate chipsets or separate integrated circuits. In some embodiments, at least two of the processor 810, the input/output hub 820 and the input/output controller hub 830 may be implemented as a single chipset.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of example embodiments of the inventive concept. Accordingly, all such modifications are intended to be included within the scope of the inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A solid state drive comprising:
a controller configured to provide a logical address of associated data through a first input-output circuit at a first speed and configured to provide the associated data through a second input-output circuit at a second speed, the controller being connected to the first input-output circuit and the second input-output circuit, the first input-output circuit being physically separated from the second input-output circuit and the second speed being greater than the first speed;
a first volatile memory comprising a mapping table, the mapping table being connected to the controller through the first input-output circuit and configured to map the logical address of the associated data that is provided through the first input-output circuit to a physical address of the associated data; and
a second volatile memory comprising a buffer memory, the buffer memory being connected to the controller through the second input-output circuit and configured to buffer the associated data that is provided through the second input-output circuit,
wherein a storage capacity of the mapping table is greater than a storage capacity of the buffer memory,
wherein the first input-output circuit includes a first number of first input-output lines,
wherein the second input-output circuit includes a second number of second input-output lines, and the first number is different from the second number, and
wherein a second parasitic capacitance of the second input-output circuit connected to the second volatile memory is different than a first parasitic capacitance of the first input-output circuit connected to the first volatile memory.

2. The solid state drive of claim 1, wherein the controller is configured to receive an input signal including the logical address of the associated data and the associated data, and
wherein the controller includes a selection circuit that is configured to separate the associated data from the logical address of the associated data.

3. The solid state drive of claim 2, wherein the selection circuit is configured to provide the logical address of the associated data to the mapping table through the first input-output circuit.

4. The solid state drive of claim 2, wherein the selection circuit is configured to provide the associated data to the buffer memory through the second input-output circuit.

5. The solid state drive of claim 1, wherein the second number of second input-output lines is greater than the first number.

6. The solid state drive of claim 1, wherein the first volatile memory comprises a first Dynamic Random Access Memory (DRAM), and the second volatile memory comprises a second DRAM that is physically separated from the first DRAM.

7. The solid state drive of claim 6, wherein a ratio of the storage capacity of the mapping table to the storage capacity of the buffer memory is 9:1.

8. The solid state drive of claim 1 further comprising a non-volatile storage memory, wherein the non-volatile storage memory is configured to receive the associated data and the physical address of the associated data from the controller.

9. The solid state drive of claim 8, wherein the buffer memory is configured to receive the associated data only from the controller through the second input-output circuit.

10. A solid state drive comprising:
a controller configured to transmit a logical address of associated data at a first speed and the associated data through an input-output circuit at a second speed that is greater than the first speed; and
a memory device including a first Dynamic Random Access Memory (DRAM) comprising a mapping table and a second DRAM comprising a buffer memory,
wherein the first DRAM is physically separated from the second DRAM,
wherein a storage capacity of the mapping table is greater than a storage capacity of the buffer memory,
wherein the mapping table is configured to receive the logical address of the associated data from the controller through the input-output circuit and configured to map the logical address of the associated data to a physical address of the associated data,
wherein the buffer memory is configured to receive the associated data from the controller through the input-output circuit and configured to buffer the associated data,
wherein the input-output circuit comprises a first input-output circuit and a second input output circuit, and
wherein a second parasitic capacitance of the second input-output circuit is different than a first parasitic capacitance of the first input-output circuit.

11. The solid state drive of claim 10, wherein the second input-output circuit is physically separated from the first input-output circuit, and
wherein the mapping table is configured to receive the logical address of the associated data from the controller through the first input-output circuit, and the buffer memory is configured to receive the associated data from the controller through the second input-output circuit.

12. The solid state drive of claim 11, wherein the first input-output circuit comprises a first number of input-output lines, and the second input-output circuit comprises a second number of input-output lines, and
wherein the second number is greater than the first number.

13. The solid state drive of claim 10, wherein the second input-output circuit is physically separated from the first input-output circuit, and
wherein the first input-output circuit is directly connected to the controller and the first DRAM, and the second input-output circuit is directly connected to the controller and the second DRAM.

14. The solid state drive of claim 10 further comprising a non-volatile storage memory, wherein the non-volatile storage memory is configured to receive the associated data and the physical address of the associated data from the controller.

15. The solid state drive of claim 14, wherein the buffer memory is configured to receive the associated data only from the controller through the input-output circuit.

16. The solid state drive of claim 10, wherein a ratio of the storage capacity of the mapping table to the storage capacity of the buffer memory is 9:1.

* * * * *